United States Patent
Yoon et al.

(10) Patent No.: US 11,573,313 B2
(45) Date of Patent: Feb. 7, 2023

(54) METHOD FOR PERFORMING DISTANCE MEASUREMENT AND AUTHENTICATION CONCURRENTLY AND ELECTRONIC DEVICE THEREOF

(71) Applicant: Samsung Electronics Co., Ltd., Gyeonggi-do (KR)

(72) Inventors: Sejong Yoon, Gyeonggi-do (KR); Moonseok Kang, Gyeonggi-do (KR); Hyunchul Kim, Gyeonggi-do (KR); Yi Yang, Gyeonggi-do (KR); Jonghoon Jang, Gyeonggi-do (KR); Doosuk Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 16/857,493

(22) Filed: Apr. 24, 2020

(65) Prior Publication Data
US 2020/0363524 A1    Nov. 19, 2020

(30) Foreign Application Priority Data
May 13, 2019    (KR) .................. 10-2019-0055447

(51) Int. Cl.
*G01S 13/76*    (2006.01)
(52) U.S. Cl.
CPC .......... *G01S 13/762* (2013.01); *G01S 13/767* (2013.01)
(58) Field of Classification Search
CPC .. G01S 13/0209; G01S 13/762; G01S 13/765; G01S 13/767; G01S 13/78;
(Continued)

(56) References Cited

U.S. PATENT DOCUMENTS

| 10,091,186 B2 | 10/2018 | Kamperman |
| 2017/0324549 A1 | 11/2017 | Abramovsky et al. |
| 2018/0254925 A1 | 9/2018 | Dutz et al. |

(Continued)

FOREIGN PATENT DOCUMENTS

| JP | 6093647 B2 | 3/2017 |
| KR | 10-1016983 B1 | 2/2011 |
| KR | 10-1781453 B1 | 9/2017 |

OTHER PUBLICATIONS

Dr. Srdjan Capkun et al., 'Change Proposal for Secure Authenticating Ranging using LRP UWB PHY', IEEE P802.15-18-0301-00-004z, Sep. 7, 2019 slides 3-11.

(Continued)

*Primary Examiner* — Timothy X Pham
(74) *Attorney, Agent, or Firm* — Cha & Reiter, LLC

(57) ABSTRACT

A first electronic device, second electronic device, and a method are disclosed herein. The first electronic device includes communication circuitry and a processor that implements the method, including transmitting, using the communication circuit, a distance measurement signal including the first secure preamble to the second electronic device, receiving a response signal through the communication circuit including a second secure preamble generated by the second electronic device from the external electronic device, authenticating the response signal based on the second secure preamble, and based on successful authentication, determining a distance to the second electronic device based on a transmission time of the distance measurement signal and a reception time of the response signal.

20 Claims, 16 Drawing Sheets

(58) Field of Classification Search
CPC . G01S 7/412; G07C 2209/63; G07C 9/00309; H04L 63/0442; H04W 12/033; H04W 12/06; H04W 12/069; H04W 12/63
See application file for complete search history.

(56) References Cited

U.S. PATENT DOCUMENTS

| | | |
|---|---|---|
| 2018/0275268 A1 | 9/2018 | Reisinger et al. |
| 2018/0367994 A1 | 12/2018 | Danev |
| 2019/0013937 A1 | 1/2019 | Leong et al. |
| 2019/0061686 A1* | 2/2019 | Neuhoff ............... H04W 4/023 |
| 2019/0116619 A1 | 4/2019 | Hauck et al. |
| 2019/0135229 A1* | 5/2019 | Ledvina ................ G01S 13/76 |
| 2020/0106877 A1* | 4/2020 | Ledvina ............ H04M 1/72436 |
| 2020/0336303 A1* | 10/2020 | Sierra ................... H04L 9/3231 |

OTHER PUBLICATIONS

Yi Yang et al., 'Adaptive Preamble Length Mode for UWB HRP Ranging', IEEE P802.15-18-0459-00-004z, Sep. 12, 2019 section 6.17.
International Search Report dated Aug. 11, 2020.
IEEE Standard for Low-Rate Wireless Networks, IEEE Computer Society, IEEE Std 802.15.4-2015.
IEEE Standard for Information technology, Telecommunications and information Exchange between systems—Local and metropolitan area networks—Specific requirements.
IEEE Standard for Local and metropolitan area networks—Part 15.4: Low-Rate Wireless Personal Area Networks (LR-WPANs).
European Search Report dated Feb. 25, 2022.

* cited by examiner

METHOD FOR PERFORMING DISTANCE MEASUREMENT AND AUTHENTICATION CONCURRENTLY AND ELECTRONIC DEVICE THEREOF

CROSS-REFERENCE TO RELATED APPLICATION(S)

This application is based on and claims priority under 35 U.S.C. § 119 to Korean Patent Application No. 10-2019-0055447, filed on "May 13, 2019", in the Korean Intellectual Property Office, the disclosure of which is incorporated by reference herein in its entirety.

BACKGROUND

Field

The present disclosure relates to distance measurements and authentication, and, more particularly, to an authenticated measurement of distance between two devices using a signal transmitted between them.

Description of Related Art

Ultra-wideband (UWB) communication is communication technology involving transmission of signals at low power using a very short pulse (e.g., a few nanoseconds) over a wide band, as compared to prominent existing communication technologies. In the past, the UWB communication was used for military purposes, such as radar and remote detection, but recently, its application has to various fields since the U.S. Federal Communications Commission (FCC) began granting commercial licensing to indoor wireless communication fields in 2002. Among these, particularly, an impulse-radio ultra-wideband (IR-UWB) technology transceiver using a very short pulse at a wide frequency band, and can accurately measure a time of arrive (TOA) or a time of flight (TOF), indicating a time at which the pulse arrives at a target. Accordingly, IR-UWB technology can execute sophisticated distance and position recognition processes, with a tolerance of dozens of centimeters (cm) in both interior and exterior environments.

The IR-UWB technology is characterized by having a very low spectrum power density at a wide frequency band, excellent transmittance within a building including walls and partitions enabling communication at relatively low power, and robustness with respect to a multi-path effect. Also, IR-UWB technology is known to be highly utilizable as radar because a time of flight for a UWB pulse to be reflected and returned from a target is relatively accurate. Owing to these characteristics, IR-UWB technology is emphasized as technology enabling precise position recognition and tracking, which can provide a foundation for the future Internet of things (IoT) society or ubiquitous technology environment. The IR-UWB technology can be used in various fields such as indoor and outdoor positional tracking, indoor navigation, asset tracking, disaster related industrial robot, home and building automation, vehicle and home smart key service, or unmanned payment system.

At present, the institute of electrical and electronics engineers (IEEE) 802.15.4 and 802.15.8 standards establish UWB physical (PHY) and medium access control (MAC) related standards. Among these, the IEEE 802.15.4 standard deals with a UWB technology standard having two different characteristics: high rate pulse repetition frequency UWB (HRP-UWB) and low rate pulse repetition frequency UWB (LRP-UWB).

The HRP-UWB is a UWB related PHY and MAC standard adopted in the IEEE 802.15.4a standard, and uses a modulation of burst position modulation—binary phase shift keying (BPM-BPSK), and supports a data rate of 0.11, 0.85, 6, 8, or 27 megabits per second (Mbps). A channel region of the HRP-UWB has a low band of, for example, 3.1 to 4.8 Giga hertz (GHz), and has a high band of, for example, 6.0 to 10.6 GHz.

The LRP-UWB is a UWB related PHY and MAC standard adopted in the IEEE 802.15.4f standard, and uses a modulation of an on off keying (OOK), Manchester scheme, and supports a data rate of 0.031, 0.25, or 1.0 Mbps. A channel region of the LRP-UWB has, for example, 6.2896 to 9.1856 GHz.

The above information is presented as background information only to assist with an understanding of the present disclosure. No determination has been made, and no assertion is made, as to whether any of the above might be applicable as prior art with regard to the present disclosure.

SUMMARY

In distance measurement using a high rate pulse repetition frequency—ultra wideband (HRP-UWB) communication, as described in the current IEEE 802.15.4 standard, a distance measurement result can be changed through a relay attack. Particularly, one problem is that a preamble playing a key role in detecting the first path within a distance measurement uses a fixed value or a predictable value. Owing to this, perform distance measurement may be attempted using a preamble value (e.g., a secure preamble) which is known only between two devices that perform the distance measurement.

If it is intended to perform the distance measurement using a secure preamble known only to the two devices, a common secure preamble may be generated through a table of random numbers previously shared between the two devices, but present solutions attempt to share the common secure preamble based on an existing public key infrastructure (PKI) encryption scheme. In this case, a problem arises in that when using the common secure preamble which can be known only between the two devices, one must always encrypt and share values for generation of the secure preamble before using the secure preamble. Accordingly, frequent information exchange for sharing is necessary to generate the secure preamble.

There is a need for a capacity to, identify whether a measurement is distance measurement between specific two devices, or a distance measured by a malicious user. Accordingly, in addition to the distance measurement, typical implementations utilize a separate authentication process for identifying whether communication between predefined two devices is authorized. The authentication process involves inputting many resources, generally consuming a time of 500 milliseconds (ms). The authentication process accordingly may result in communication congestion because of the additional communication load when authentication is continually being re-conducted.

One or more embodiments of the present disclosure are to provide a method for, in response to authentication being needed between an electronic device and an external electronic device in a situation where the electronic device performs distance measurement using UWB communication with the external electronic device, including authentication related information in a signal for distance measurement and forwarding the same, thereby performing distance measurement and authentication operations concurrently.

Also, one or more embodiments of the present disclosure may perform an authentication process concurrently with distance measurement and thus not only make distance measurement between authenticated devices without a separate authentication procedure but also, in course of a process for distance measurement, perform an authentication procedure between the devices and a user related operation associated with an authenticated position, thereby decreasing an authentication procedure unnecessary for a user and achieving current consumption decrease and operation simplification.

Technological solutions the present document seeks to achieve are not limited to the above-mentioned technological solutions, and other technological solutions not mentioned above would be able to be clearly understood by a person having ordinary skill in the art from the following statement.

According to one or more embodiments of the present disclosure, an electronic device includes a communication circuit performing communication with an external electronic device, at least one processor operably connected with the communication circuit; and at least one memory operably connected with the at least one processor, wherein the at least one memory stores instructions executable by the at least one processor to cause the electronic device to: generate a first secure preamble, transmit, using the communication circuit, a distance measurement signal including the first secure preamble to the external electronic device, receive a response signal through the communication circuit including a second secure preamble generated by the external electronic device from the external electronic device, authenticate the response signal based on the second secure preamble, and based on successful authentication, determine a distance to the external electronic device based on a transmission time of the distance measurement signal and a reception time of the response signal.

According to one or more embodiments of the present disclosure, an electronic device includes a communication circuit performing communication with an external electronic device, at least one processor operably connected with the communication circuit, and at least one memory operably connected with the at least one processor, wherein the at least one memory stores instructions executable by the at least one processor to cause the electronic device to generate a first secure preamble, receive, using the communication circuit, a distance measurement signal including a second secure preamble generated by the external electronic device from the external electronic device, authenticate the distance measurement signal based on the second secure preamble of the external electronic device included in the received distance measurement signal and in response to successful authentication, transmit a response signal including the first secure preamble to the external electronic device.

According to one or more embodiments of the present disclosure, an operation method of an electronic device includes generating a first secure preamble, controlling by a processor a communication circuit to transmit a distance measurement signal including the first secure preamble to an external electronic device, controlling the communication circuit to receive a response signal including a second secure preamble from the external electronic device, authenticating the response signal of the external electronic device based on the second secure preamble of the external electronic device included in the received response signal, and in response to successful authentication, determining a distance to the external electronic device based on a transmission time of the distance measurement signal and a reception time of the response signal.

A method of one or more embodiments and an electronic device thereof may perform authentication in course of distance measurement, thereby being protected from an external attack such as a relay attack.

An effect obtainable from the disclosure is not limited to the above-mentioned effects, and other effects not mentioned will be able to be apparently understood from the following statement by a person having ordinary skill in the art to which the disclosure pertains.

DETAILED DESCRIPTION

Certain embodiments are described below in detail with reference to the accompanying drawings.

Figure 1:
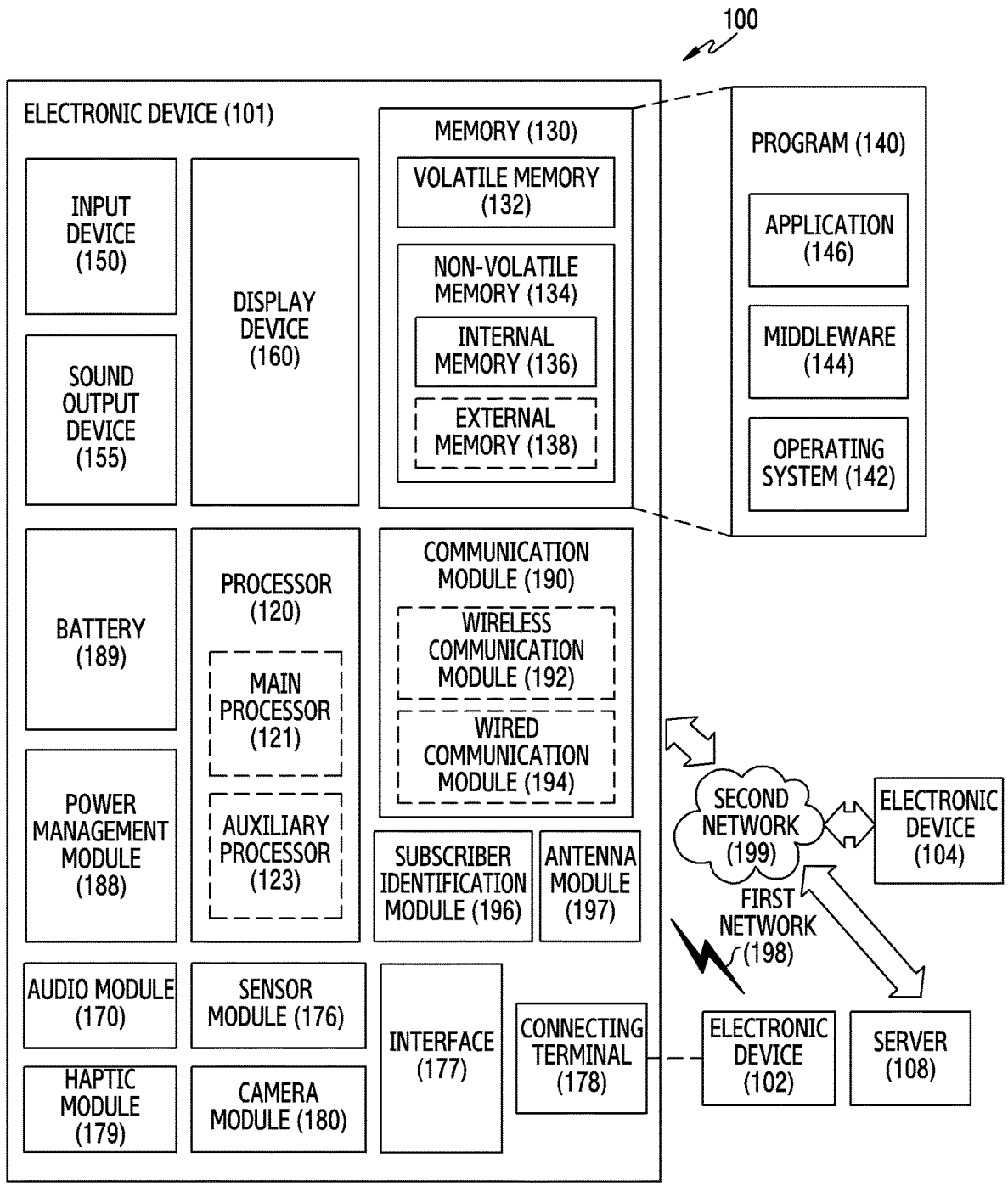
FIG. 1 is a block diagram of an electronic device within a network environment according to one or more embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
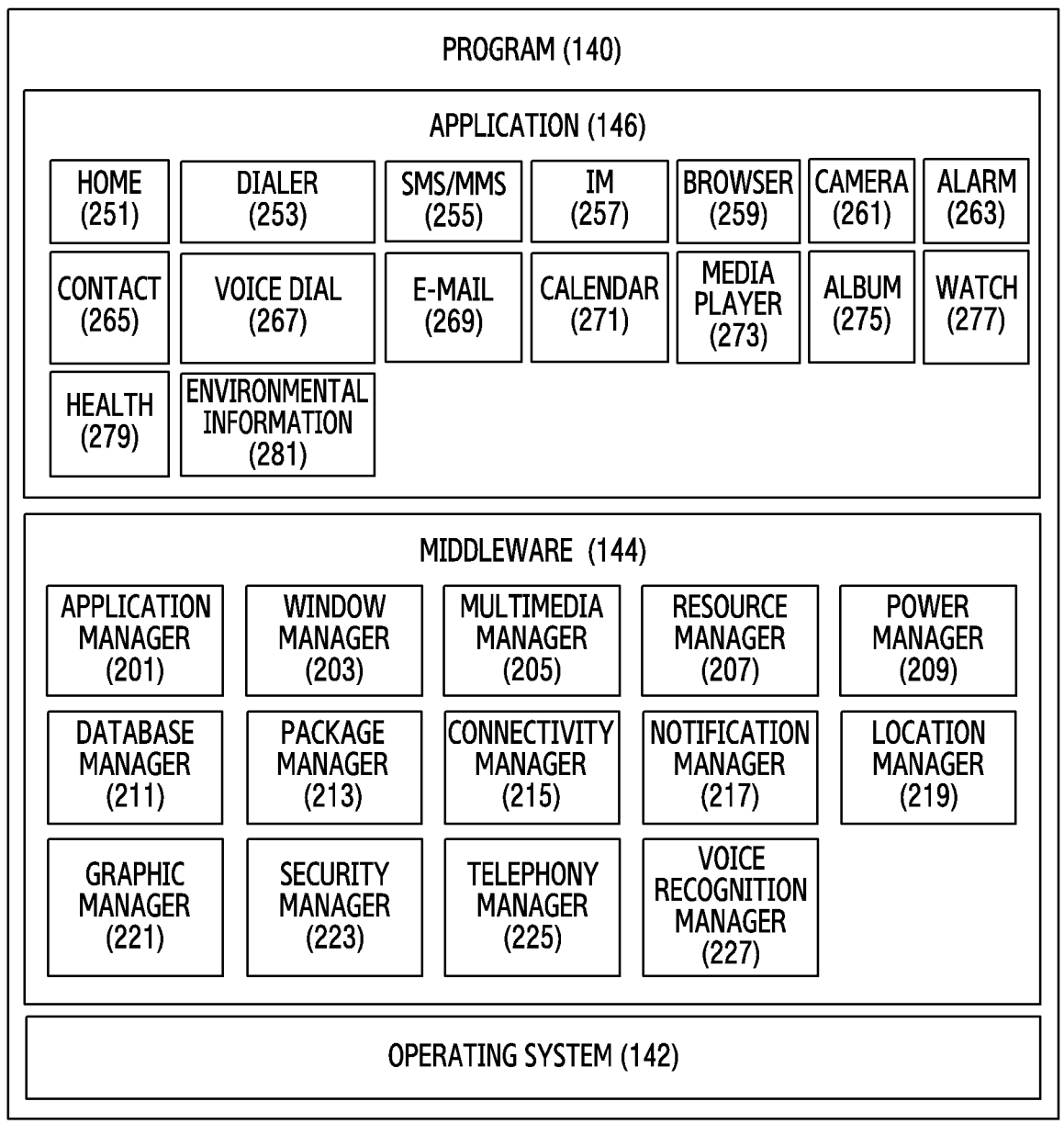
FIG. 2 is a block diagram exemplifying a program according to one or more embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, the antenna module 197, one or more driver program and hardware abstraction layer (HAL) (231, 235, 239 or 243) for driving a Bluetooth 231, an ultra wide band (UWB), a near field communication (NFC) 239, a serial peripheral interface (SPI) 243.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, a voice recognition manager 227, a Bluetooth manager 228, a ultra wide band (UWB) manager.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The Bluetooth manager 228, for example, may manage a Bluetooth communication function provided by the electronic device 101, and may provide an application programming interface (API) related to the Bluetooth communication to an application program. The UWB manager 229, for example, may manage a UWB communication function provided by the electronic device 101, and may provide an API related to the UWB communication to an application program.

The middleware 144 may omit a part of these components, or add one or more other components. According to one or more embodiments, at least a part of the middleware 144 may be incorporated into the OS 142, or may be implemented as a software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), environmental information 281 (e.g., for measuring air pressure, humidity, or temperature information) application, a payment 283, or a UWB 285 (e.g., for providing payment/customer, ranging/localization, or smart key). According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
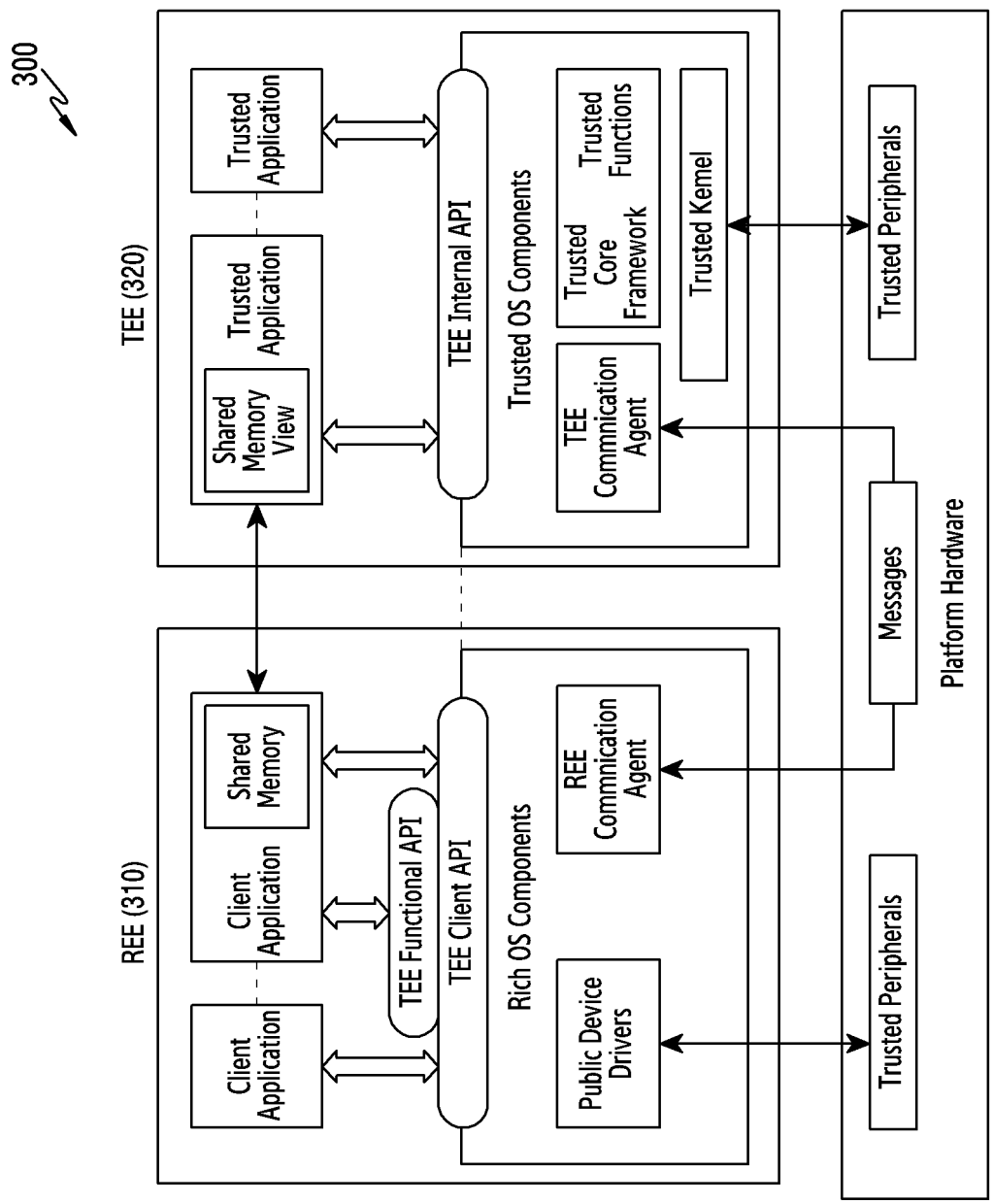
FIG. 3 is a block diagram illustrating a general execution environment and a secure execution environment managed in an electronic device according to one or more embodiments.

FIG. 3 is a block diagram 300 illustrating a general execution environment and a secure execution environment managed in an electronic device (e.g., the electronic device 101) according to one or more embodiments. According to one or more embodiments, the electronic device may manage execution environments having a plurality of secure levels for the sake of security strengthening. The plurality of execution environments may include, for example, a rich execution environment (REE) 310 and a trusted execution environment 320 (TEE). The REE 310 may be, for example, a first execution environment having a first secure level. The TEE 320 may be a second execution environment having a second secure level different from (e.g., higher than) the first secure level. According to an embodiment, the electronic device 101 may include a third execution environment having a third secure level, but the disclosure is not limited to this example.

The TEE 320 may store data utilizing a relatively high secure level in a safe environment and perform a related operation. The TEE 320 may operate on an application processor (e.g., the processor 120 of FIG. 1) of the electronic device, and operate on the basis of a reliable hardware structure determined in a process of manufacturing the electronic device. The TEE 320 may divide the application processor or a memory into a general region and a secure region, and operate in the secure region. The TEE 320 may set to operate software or hardware utilizing security in the secure region. The electronic device may manage a secure execution environment through a physical change of hardware or a logical change of software. The TEE 320 may be denoted as an embedded secure element (eSE), a secure element, or a trust zone.

The TEE 320 and the REE 310 may be isolated from each other through hardware restriction, and may be isolated in a software manner in the same hardware and be operated. At least one application (e.g., a UWB smart key, payment, contact, e-mail, or browser) operating in the REE 310 may use an API (e.g., a TEE functional API or a TEE client API) permitted for access to the TEE 320. By using the API, the at least one application may forward a message from a communication agent (i.e., a REE communication agent) of the general execution environment to a communication agent (i.e., a TEE communication agent) of the secure execution environment. The message may be implemented to be forwarded to the TEE 320 in a hardware manner. The communication agent of the secure execution environment may receive the message and forward the same to a secure application (i.e., a trusted application (TA)) (e.g., a DRM, a secure payment module, or a secure biometric information module) related to the message. The secure application may perform an operation related to the message, and may forward a result of the operation to the communication agent of the general execution environment through the communication agent of the secure execution environment. The communication agent of the general execution environment may forward the received result to at least one application which is being managed in the general execution environment.

Figure 4:
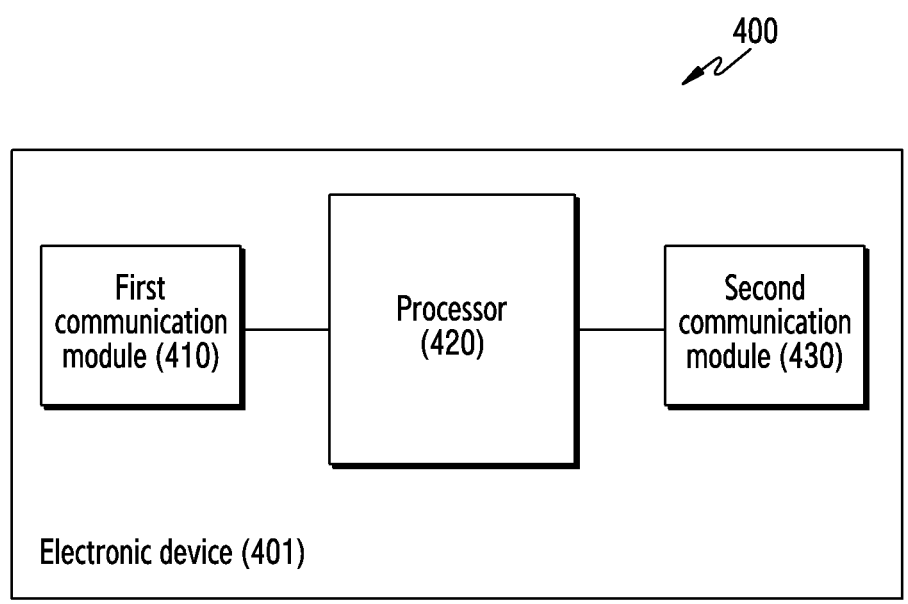
FIG. 4 is a block diagram illustrating an example of a functional construction of an electronic device according to one or more embodiments.

FIG. 4 is a block diagram 400 illustrating an example of a functional construction of an electronic device 401 (e.g., the electronic device 101, a smart key, a vehicle, or a door lock) according to one or more embodiments. FIG. 4 simply illustrates a minimum functional construction utilized for realizing a method proposed in the present disclosure.

Referring to FIG. 4, the electronic device 401 may include a processor 420, a first communication module 410 and/or a second communication module 430 (e.g., communication circuits). However, the disclosure is not limited to this example, and the electronic device 401 may omit at least one of these components, or add one or more other components.

According to one or more embodiments, the first communication module 410 may be used to exchange information for authentication with an external electronic device (e.g., the electronic device 104 of FIG. 1, a portable phone, a vehicle, a door lock, or a smart key). In accordance with an embodiment, the first communication module 410 may transmit credential information to the external electronic device and receive credential information from the external electronic device, under the control of the processor 420. The credential information may be provided by the processor 420. In an embodiment, the credential information may be processed and provided by the processor 420 in the TEE 320. In another embodiment, the credential information may be provided by the first communication module 410 under the control of the processor 420 as well. The credential information may be used for provision of a secure preamble code used at future distance measurement, and also the credential information may be used for provision of a secure preamble which is based on the provided secure preamble code. The first communication module 410 may use a communication scheme such as Bluetooth, WiFi, UWB, or low frequency (LF). Also, the first communication module 410 may exchange, with the external electronic device, parameters utilized for establishing communication connection with the external electronic device, by using the second communication module 430. In response to the second communication module 430 using a UWB communication scheme, a parameter such as a channel, a preamble code, a pulse repetition frequency (PRF), or a data rate may be exchanged.

According to one or more embodiments, the second communication module 430 may be used to measure a distance with the external electronic device. The second communication module 430 may use a UWB scheme. Under the control of the processor 420, the second communication module 430 may provide a signal for measuring a distance with the external electronic device and transmit the provided signal to the external electronic device, and receive a related signal from the external electronic device. The second communication module 430 may use a preamble in order to provide a signal. Also, the second communication module 430 may provide a signal having various formats. In an embodiment, by using a physical layer UWB signal system which is based on the IEEE 802.15.4a, the second communication module 430 may measure a distance and a position in a high rate pulse repetition frequency—ultra wideband (HRP-UWB) scheme of the ISO 24730-62 standard defining a wireless interface of real time locating systems (RTLS).

Below, the present disclosure describes a frame format of a signal which is transmitted in the HRP-UWB scheme defined in the ISO 24730-62 standard which may be used in the second communication module 430.

Figure 5A:
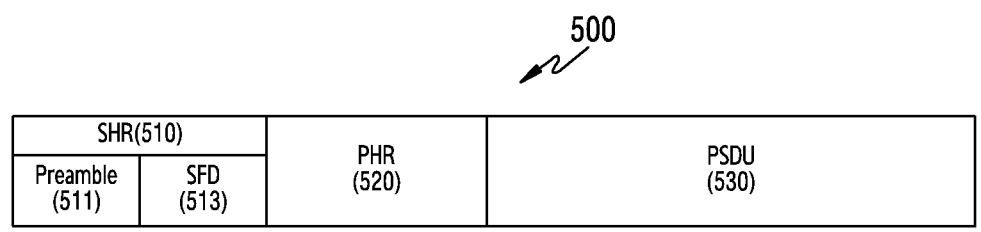
FIG. 5A is a diagram illustrating a frame of a physical layer signal transmitted in an HRP-UWB scheme according to an embodiment.

FIG. 5A is a diagram illustrating a frame of a physical layer signal transmitted in an HRP-UWB scheme according to an embodiment.

Referring to FIG. 5A, a frame or a PHY protocol data unit (PPDU) 500 of a signal transmitted in the HRP-UWB scheme may include a synchronization header (SHR) 510, a PHY header (PHR) 520, and a data field (i.e., a physical service data unit (PSDU)) 530.

The SHR 510 may include a preamble 511 and a start of frame delimiter (SFD) 513.

The preamble 511 may have 16, 64, 1024 or 4096 symbols, and the preamble 511 to be used may be specified according to the requirements of an application field. Table 1 shows characteristics of the preamble 511.

TABLE 1

| Channel number | Code length | Peak PRF (MHz) | Mean PRF (MHz) | Delta length | Number of chips per symbol | Symbol length $T_{psym}$(ns) | Basic transmission rate Msymbol/s |
|---|---|---|---|---|---|---|---|
| {0:15} | 31 | 31.20 | 16.10 | 16 | 496 | 993.59 | 1.01 |
| {0:3, 5:6, 8:10, 12:14} | 31 | 7.80 | 4.03 | 64 | 1984 | 3974.36 | 0.25 |
| {0:15} | 127 | 124.80 | 62.89 | 4 | 508 | 1017.63 | 0.98 |

As shown in Table 1, a preamble of another characteristic may be used according to a channel. Each symbol of the preamble may be implemented using 496, 1984 or 508 chips. Also, each symbol of the preamble may be constructed on the basis of a preamble code of a length 31 or a preamble code of a length 127. Each preamble code may be a series of code symbols each having one of three values {−1, 0, 1}. In an example, the preamble code of the length 31 may be implemented using 31 codes each having one of values {−1, 0, 1}. One of preamble codes may be used for data transmission. One symbol of the preamble may be implemented using as many chips (e.g., 31×16=496, 127× 4=508) as (delta length)×(code length).

Figure 5B:
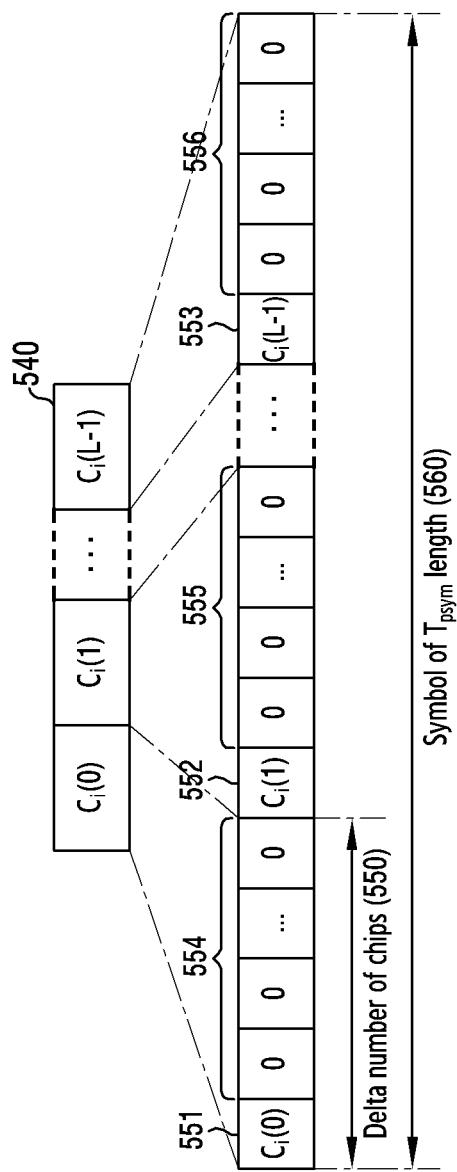
FIG. 5B is a diagram illustrating an example of a construction of a preamble symbol according to an embodiment.

FIG. 5B is a diagram illustrating an example of a construction of a preamble symbol according to an embodiment.

Referring to FIG. 5B, the preamble symbol 560 of an embodiment may be implemented based on a preamble code 540 of a length (L). To construct (e.g., generate) one preamble symbol 560, the first chip 551, 552 or 553 of a (delta length) number of chips 550 has a signal corresponding to one value among preamble codes 540 in order, and the remaining chips 554, 555 and 556, that is, the second chip to a (delta length) chip have no signal.

By recognizing the preamble 511, a receiving device may recognize that a UWB packet frame is being transmitted. Accordingly to this, a preamble 511 field may be denoted as a synchronization (SYNC) field as well. The preamble 511 of a long length such as 1024 or 4096 symbols may improve a signal-to-noise ratio (SNR) through a processing gain and thus, may be preferred by a non-coherent receiving device.

The SFD 513 is a signal for notifying that the preamble 511 ends and the PHR 520 starts. The SFD 513 may be used to establish frame timing. A time of obtaining the SFD 513 at ranging may be settled as a packet frame transmission time and/or a packet frame reception time. The SFD 513 may have a length of 8 symbols or 16 symbols.

The PHR 520 may be implemented using 16 symbols. The PHR 520 may include information utilized for successful decoding of a packet in the receiving device. In an example, the PHR 520 may include information such as a data rate used to transmit the PSDU 530, a preamble length of a current frame, and a length of the PSDU 530 capable of having a symbol length of 0 to 1209.

The PSDU 530 may include data that will be transmitted. The data loaded in the PSDU 530 may be transmitted at a data rate indicated in the PHR 520. The data loaded on the PSDU 530 and transmitted may be generated according to a format of a MAC layer frame shown in FIG. 6 described later.

Figure 6:
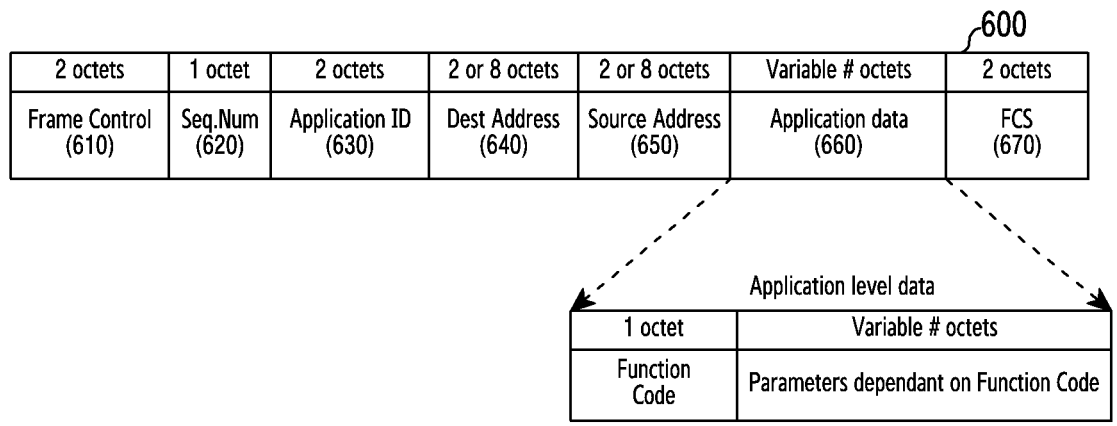
FIG. 6 is a diagram illustrating a format of a MAC layer frame loaded on a PSDU and transmitted according to an embodiment.

FIG. 6 is a diagram illustrating a format of a MAC layer frame loaded on a PSDU and transmitted according to an embodiment.

Referring to FIG. 6, the MAC layer frame 600 may be implemented using a frame control field 610 of 2 octets, a sequence number field 620 of 1 octet, an application ID field 630 of 2 octets, a destination address field 640 of 2 or 8 octets, a source address field 650 of 2 or 8 octets, an application data field 660 of a variable length, and a frame check sequence (FCS) field 670 of 2 octets.

According to one or more embodiments, a method and device proposed in the present disclosure may use a physical layer frame which does not have the MAC layer frame 600 of FIG. 6, that is, in which a length of the PSDU 530 is 0.

Referring again to FIG. 4, according to one or more embodiments, the processor 420 may be coupled with the first communication module 410 and the second communication module 430, and control to perform distance measurement and authentication with an external electronic device.

In the block diagram of FIG. 4 according to an embodiment, the processor 420 is illustrated separately from the first communication module 410 and the second communication module 430, but the processor 420 may be embedded in the first communication module 410 and/or the second communication module 430, and a plurality of processors including a processor embedded in the first communication module 410 and/or the second communication module 430 may be coupled to construct the processor 420.

According to one or more embodiments, the processor 420 may transmit and/or receive information for providing information utilized for authentication by using a first communication scheme of the first communication module 410. In an embodiment, the processor 420 may provide credential information, and transmit the provided credential information to an external electronic device by using the first communication module 410. For example, the processor 420 may encrypt the credential information with a public key of the external electronic device previously received from the external electronic device, and transmit the encrypted credential information to the external electronic device. The external electronic device may receive the encrypted credential information, and decode the credential information by using a private key of the external electronic device.

To use a public key encryption scheme, the electronic device and the external electronic device may utilize e a public key exchange process therebetween. Accordingly, in an embodiment, the processor 420 may perform at least a one-time registration operation with the external electronic device, and exchange a public key. The public key exchange process may be carried out between the electronic device and external electronic device concerned parties, but may be carried out through an authentication server as well. In an embodiment, the electronic device may request for a public key of the external electronic device to the authentication server, and receive the public key of the external electronic device from the authentication server. Also, the processor 420 may identify whether it is set to perform distance measurement by using a secure preamble with the external electronic device before exchanging a public key with the external electronic device in person or through the authentication server, and in response to being set to use the secure preamble, the processor 420 may exchange the public key with the external electronic device in person or through the authentication server as well. At this time, the registration operation may be varied according to the external electronic device or an authentication level of the public key of the external electronic device. In accordance with an embodiment, in response to the electronic device being a vehicle, the external electronic device or the authentication level of the public key of the external electronic device may be varied according to whether a user of the electronic device is a vehicle owner or is a temporary user, and in response to the user of the electronic device being the vehicle owner, the electronic device may have to enter a registration mode as well. And, the credential information may be various in size, but may have a size of 128, 192 or 256 bits in an advanced encryption standard (AES) based encryption scheme.

In response to the transmitting of a signal including credential information by using the first communication module 410, the processor 420 may receive a signal including credential information of the external electronic device from the external electronic device. The received credential information has been encrypted with a public key of the electronic device previously exchanged by the external electronic device. By using a private key of the electronic device, the processor 420 may decode the credential information of the external electronic device.

According to one or more embodiments, the processor 420 may provide a secure preamble, based at least partially on its own credential information (below, first credential information) and credential information (below, second credential information) of the external electronic device received from the external electronic device. Or, the processor 420 may control the second communication module 430 to provide the secure preamble, based at least partially on the first credential information and the second credential information. In an embodiment, the processor 420 or the second communication module 430 may provide a secure preamble having the preamble characteristic shown in Table 1 and FIG. 5B. According to an embodiment, the processor 420 or the second communication module 430 may provide and use the preamble code of the length 31 or the preamble code of the length 127 in the preamble characteristic shown in Table 1 and FIG. 5B, based at least partially on the first credential information and the second credential information, and keep the remaining characteristics identical. According to an embodiment, the processor 420 or the second communication module 430 may provide a secure preamble code of a length 31 or a secure preamble code of a length 127 by using a symmetric-key provision algorithm (for example, AES 128), on the basis of the first credential information and the second credential information. In an embodiment, in response to the first credential information being a key value of 128 bits, and the second credential information being a plain text of 128 bits, the processor 420 or the second communication module 430 may provide an inherent 128-bit cipher text by using an AES encryption algorithm, on the basis of these two credential information. And, the processor 420 or the second communication module 430 may provide the secure preamble code of the length 31 or the secure preamble code of the length 127, by taking a part of the 128-bit cipher text, or by taking a part after performing a process such as scrambling.

The second communication module 430 may provide a frame including a preamble of a signal that will be transmitted, by using the secure preamble code of the length 31 or the secure preamble code of the length 127 which is provided by the processor 420 or the second communication module 430 itself.

In the above description, an example in which the secure preamble code of the length 31 or the secure preamble code of the length 127 has been given based on the HRP-UWB standard, but an embodiment is not necessarily limited to this, and it is possible to provide a preamble by using a secure preamble code of another length as well.

According to one or more embodiments, the processor 420 may control the second communication module 430 to measure a distance with the external electronic device. In a state where the electronic device is connected in the first communication scheme by the first communication module 410, the electronic device may be connected in the second communication scheme by using the second communication module 430. In response to all the first communication scheme and the second communication scheme being UWB, the processor 420 may not need to perform a separate operation for connection of the second communication scheme, and the electronic device may have the one of the first communication module 410 and the second communication module 430, without needing to have the other of the first communication module 410 and the second communication module 430.

For distance measurement with the external electronic device, the processor 420 may control the second communication module 430 to provide a signal including a conventional preamble which uses a preamble code. The provided signal may have various formats (e.g., according to a standard), but in an embodiment, in response to measuring a distance and a position in a scheme defined in the ISO 24730-62, the provided signal may include a frame of a form illustrated in FIG. 5A.

For the distance measurement with the external electronic device, the processor 420 may perform a ToF-based distance measurement scheme. In an embodiment, the processor 420 may perform a two-way ranging (TWR) scheme. In a representative embodiment, the TWR scheme is a single-sided TWR (SS-TWR) or a double-sided TWR (DS-TWR). In response to measuring the distance in the DS-TWR scheme, it may be possible that a counterpart electronic device as well as the electronic device perform the distance measurement, together.

Figure 7:
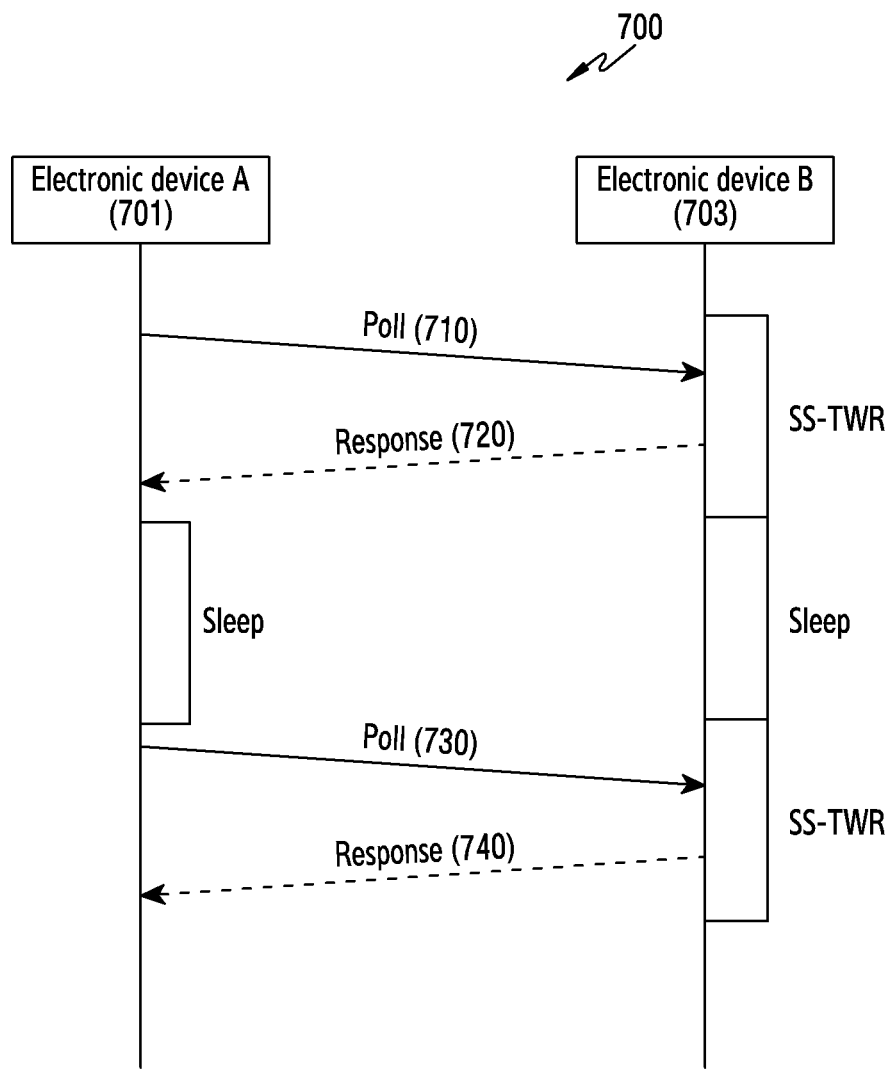
FIG. 7 is a diagram illustrating a single-sided two-way ranging (SS-TWR) scheme according to an embodiment.

FIG. 7 is a diagram 700 illustrating an SS-TWR scheme according to an embodiment.

According to one or more embodiments, an electronic device A 701 or an electronic device B 703 illustrated in FIG. 7 may be the electronic device 101 illustrated in FIG. 1 or the electronic device 401 illustrated in FIG. 4. According to the SS-TWR scheme of FIG. 7, the electronic device A 701 initiating distance measurement (i.e., ranging) may transmit a Poll signal 710 or 730 for distance measurement to the electronic device B 703, and receive a response signal 720 or 740 responsive to the Poll signal 710 or 730 from electronic device B 703. The electronic device A 701 may determine a signal forward time from the electronic device A 701 to the electronic device B 703, on the basis of a time of transmitting the Poll signal, a time of receiving the response signal, and a time of internal processing in the electronic device B 703. From this, electronic device A 701 may measure a distance through physical determination. According to an embodiment, the electronic device B 703 may include its own internal processing time in the response signal 720 or 740 and forward the same to the electronic device A 701. Also, according to an embodiment, to reduce power consumption of the electronic device A 701 and the electronic device B 703, the Poll signal 710 or 730 may include a time at which a next Poll signal will be transmitted. Accordingly, the electronic device A 701 and the electronic device B 703 may enter a sleep mode in which the minimum power source is used, until a time at which a next Poll signal will be transmitted after distance measurement of the current SS-TWR scheme, and decrease used power. In the SS-TWR scheme, the electronic device A 701 may measure a distance, but the electronic device 703 may not measure the distance.

Figure 8:
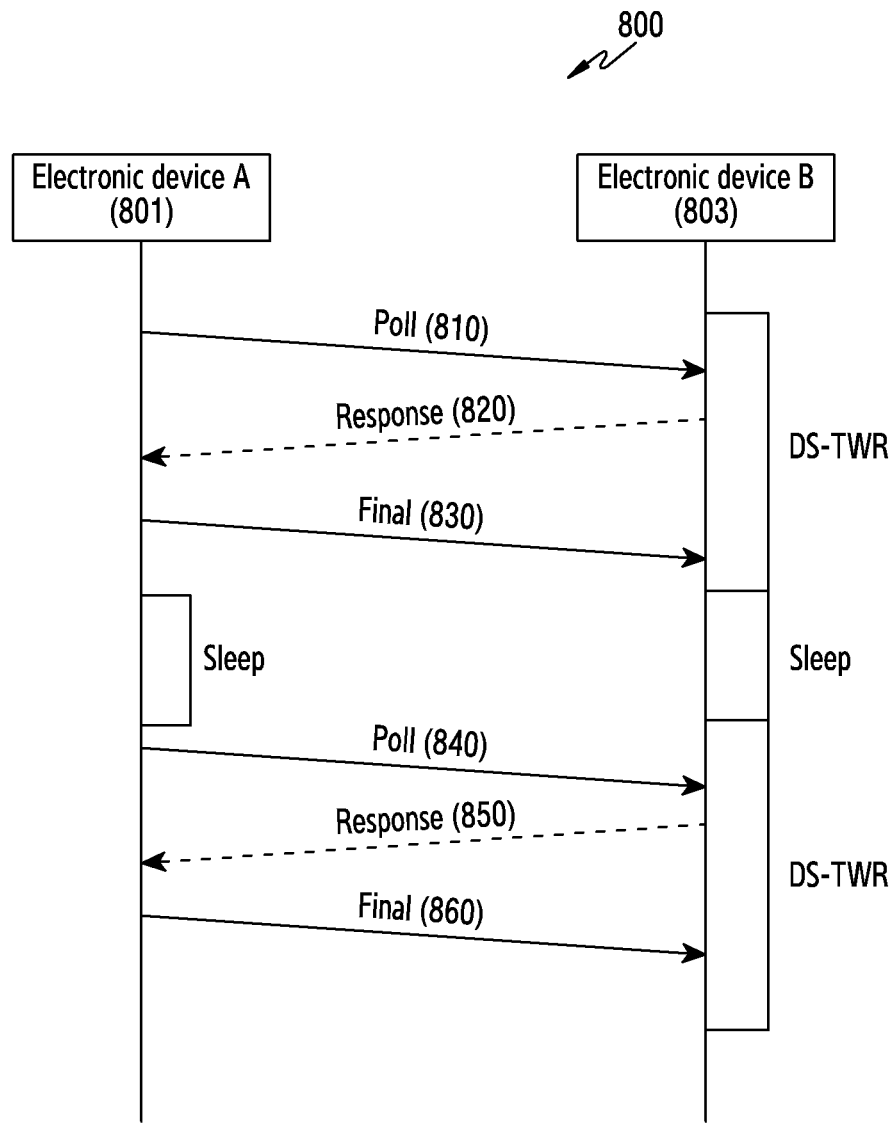
FIG. 8 is a diagram illustrating a double-sided two-way ranging (DS-TWR) scheme according to an embodiment.

FIG. 8 is a diagram 800 illustrating a DS-TWR scheme according to an embodiment.

According to one or more embodiments, an electronic device A 801 or an electronic device B 803 illustrated in FIG. 8 may be the electronic device 101 illustrated in FIG. 1 or the electronic device 401 illustrated in FIG. 4.

According to the DS-TWR scheme of FIG. 8, the electronic device A 801 initiating ranging may transmit a Poll signal 810 or 840 for distance measurement to the electronic device B 803, and receive a response signal 820 or 850 responsive to the Poll signal 810 or 840 from the electronic device B 803, and again transmit a final signal 830 or 860 to the electronic device B 803. Accordingly to this, the electronic device B 803 may receive the Poll signal 810 or 840 from the electronic device A 801, and transmit the response signal 820 or 850 responsive to the Poll signal 810 or 840 to the electronic device A 801, and again receive the final signal 830 or 860 from the electronic device A 801. The electronic device A 801 may determine a signal forward time from the electronic device A 801 to the electronic device B 803, on the basis of a time of transmitting the Poll signals 810 and 840, a time of receiving the response signals 820 and 850, and a time of internal processing of the electronic device B 803. From this, the electronic device A 801 may measure a distance through physical determination. The electronic device B 803 may determine a signal forward time from the electronic device B 803 to the electronic device A 801, on the basis of a time of transmitting the response signals 820 and 850, a time of receiving the final signals 830 and 860, and a time of internal processing of the electronic device A 801. From this, the electronic device B 803 may measure a distance through physical determination. According to an embodiment, the electronic device B 803 may include its own internal processing time in the response signals 820 and 850 and forward the same to the electronic device A 801, and the electronic device A 801 may include its own internal processing time in the final signals 830 and 860 and forward the same to the electronic device B 803. Also, according to an embodiment, to reduce power consumption of the electronic device A 801 and the electronic device B 803, the response signals 820 and 850 may include a time at which a next Poll signal has to be transmitted. Accordingly, the electronic device A 801 and the electronic device B 803 may enter a sleep mode in which the minimum power source is used till a time at which a next Poll signal will be transmitted after distance measurement of the current DS-TWR scheme, and decrease used power. In the DS-TWR scheme, the electronic device A 801 and the electronic device B 803 all may measure a distance.

According to one or more embodiments, in response to meeting a specified condition, the processor 420 of the electronic device 401 may control the second communication module 430 to provide a frame including a secure preamble in order to perform distance measurement and authentication operations concurrently. In the specified condition, the processor 420 may set a distance between the electronic device 401 and the external electronic device 102, and an event occurring in the electronic device 401 and the external electronic device 102. In an embodiment, in response to the distance between the electronic device 401 and the external electronic device 102 being a previously specified distance or less or in response to a specified event occurring, the processor 420 may control the second communication module 430 to provide a frame including a secure preamble. The second communication module 430 may transmit a frame signal including the secure preamble, and perform distance measurement and authentication operations concurrently. The processor 420 may set the specified event, for example, an event in which a user opens a vehicle door or presses an engine button or an event in which the user advances within a specific distance. In response to the specified event occurring, the processor 420 may forward corresponding content to the external electronic device 102 through the first communication module 410 or the second communication module 430, and notify having to use a frame including a secure preamble in order to thereafter exchange information between the electronic device 401 and the external electronic device 102.

According to one or more embodiments, in response to it being distinguished that a specified condition is met and thus distance measurement and authentication are utilized, the processor 420 may control the second communication module 430 to provide a frame signal including a secure preamble capable of enabling to perform distance measurement and authentication, concurrently, with the external electronic device 102.

Figure 9:
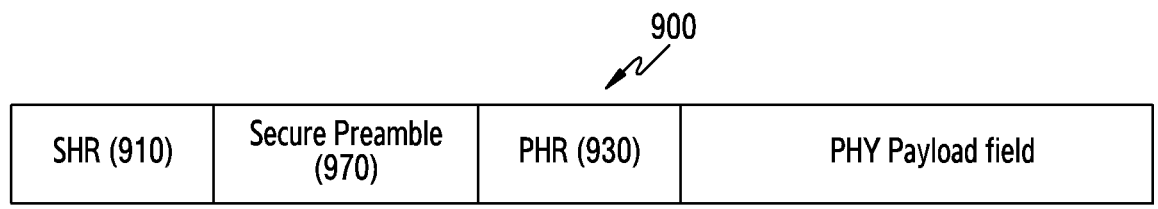
FIG. 9 is a diagram illustrating a frame of a physical layer signal transmitted in an HRP-UWB scheme proposed in the present disclosure according to one or more embodiments.

According to one or more embodiments, the processor 420 or the second communication module 430 may position a secure preamble provided for distance measurement and authentication, instead of a conventional preamble, in the preamble field 511 of FIG. 5A in which the conventional preamble has ever been positioned. According to another embodiment, as illustrated in FIG. 9, the processor 420 or the second communication module 430 may additionally add a secure preamble field 970 between an SHR 910 and a PHR 930, and position the provided secure preamble in the secure preamble field 970.

According to one or more embodiments, by first transmitting a specific command signal or display signal through the first communication module 410 or the second communication module 430 before transmitting a signal including a secure preamble provided for distance measurement, the processor 420 may notify transmitting thereafter a signal which uses the secure preamble.

According to one or more embodiments, by using a signal including a provided secure preamble, the processor 420 and/or the second communication module 430 may perform distance measurement and authentication concurrently.

In response to using SS-TWR as a distance measurement scheme according to an embodiment, the processor 420 or the second communication module 430 of the electronic device (e.g., the electronic device A 701 of FIG. 7) may transmit a signal (e.g., the frame 500 of FIG. 5A or the frame 900 of FIG. 9) including a secure preamble to the external electronic device (e.g., the electronic device B 703 of FIG. 7). The external electronic device may distinguish whether a secure preamble provided in itself through previously exchanged first and second credential information is the same as the secure preamble included in the signal received from the electronic device or a secure preamble code. In response to both the secure preambles or the secure preamble codes being identical as the distinction result, the external electronic device may complete authentication that the received signal has been transmitted from a legal user. In response to the authentication on the received signal being completed, the external electronic device may transmit a response signal including a secure preamble to the electronic device. At this time, the secure preamble used may be one provided using a secure preamble code provided using at least a part of the first credential information and the second credential information in compliance with a defined rule. Also, a secure preamble included in a signal transmitted to the electronic device from the external electronic device may be different from the secure preamble included in the signal transmitted to the external electronic device from the electronic device. In response to the secure preamble or secure preamble code included in the signal transmitted from the electronic device being different from the secure preamble or secure preamble code provided from the external electronic device in itself as the distinction result, it is distinguished that authentication fails and thus, communication ends and distance measurement fails.

In response to the processor 420 of the electronic device receiving a signal including a secure preamble for distance measurement transmitted from the external electronic device, the processor 420 may compare a secure preamble or secure preamble code provided using at least part of the first credential information and the second credential information in compliance with a defined rule and a secure preamble or secure preamble code obtained from the received signal. In response to both the secure preambles or the secure preamble codes being identical as the comparison result, the processor 420 completes authentication that the received signal has been transmitted from the legal external electronic device, and in accordance with an embodiment, completes even distance measurement with the external electronic device by using TOF information of a signal transmitted and/or received under the control of the processor 420 according to the SS-TWR distance measurement scheme illustrated in FIG. 7. In response to the secure preamble or secure preamble code included in the signal transmitted from the external electronic device and the secure preamble or secure preamble code provided by the processor 420 or the second communication module 430 being different from each other, the processor 420 may fail in authentication, and fail even in distance measurement, and terminate communication.

According to one or more embodiments, the processor 420 of the electronic device may control the second communication module 430 to proceed with distance measurement and authentication processes concurrently, while once more proceeding with separate authentication in a preset specific situation including a situation where a vehicle door may be open or a situation where a vehicle engine may start, such as vehicle door open button pressing, door button pressing, door handle catching, engine button pressing, or a distance being narrowed within a specific range.

Figure 10:
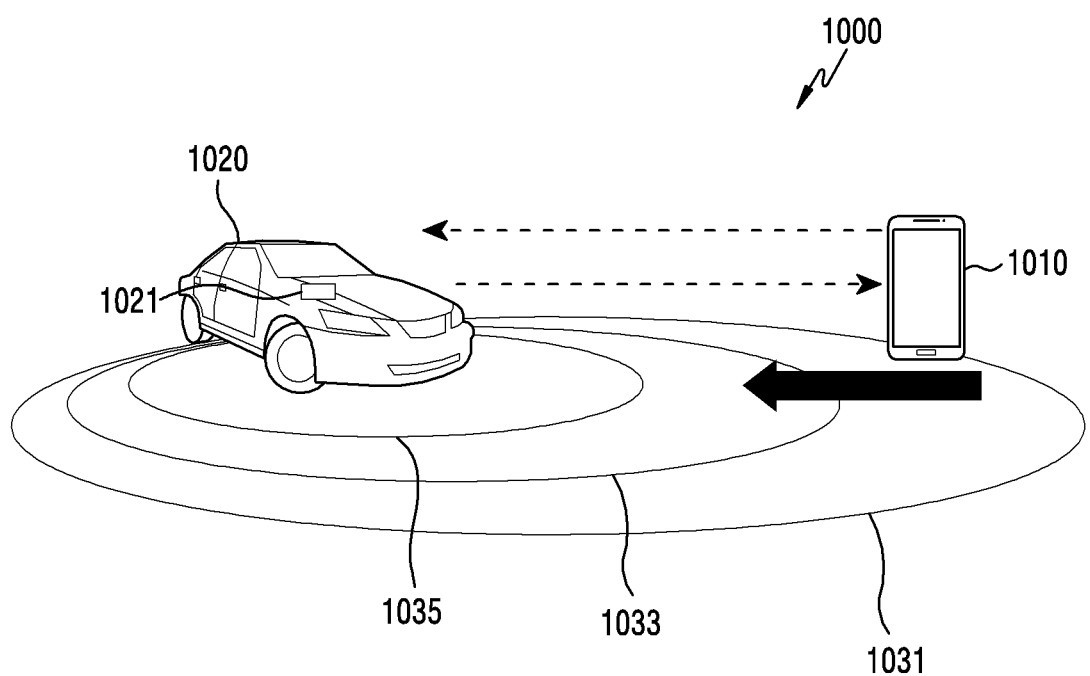
FIG. 10 is a diagram illustrating a situation where distance measurement and authentication are performed according to one or more embodiments.
Figure 11:
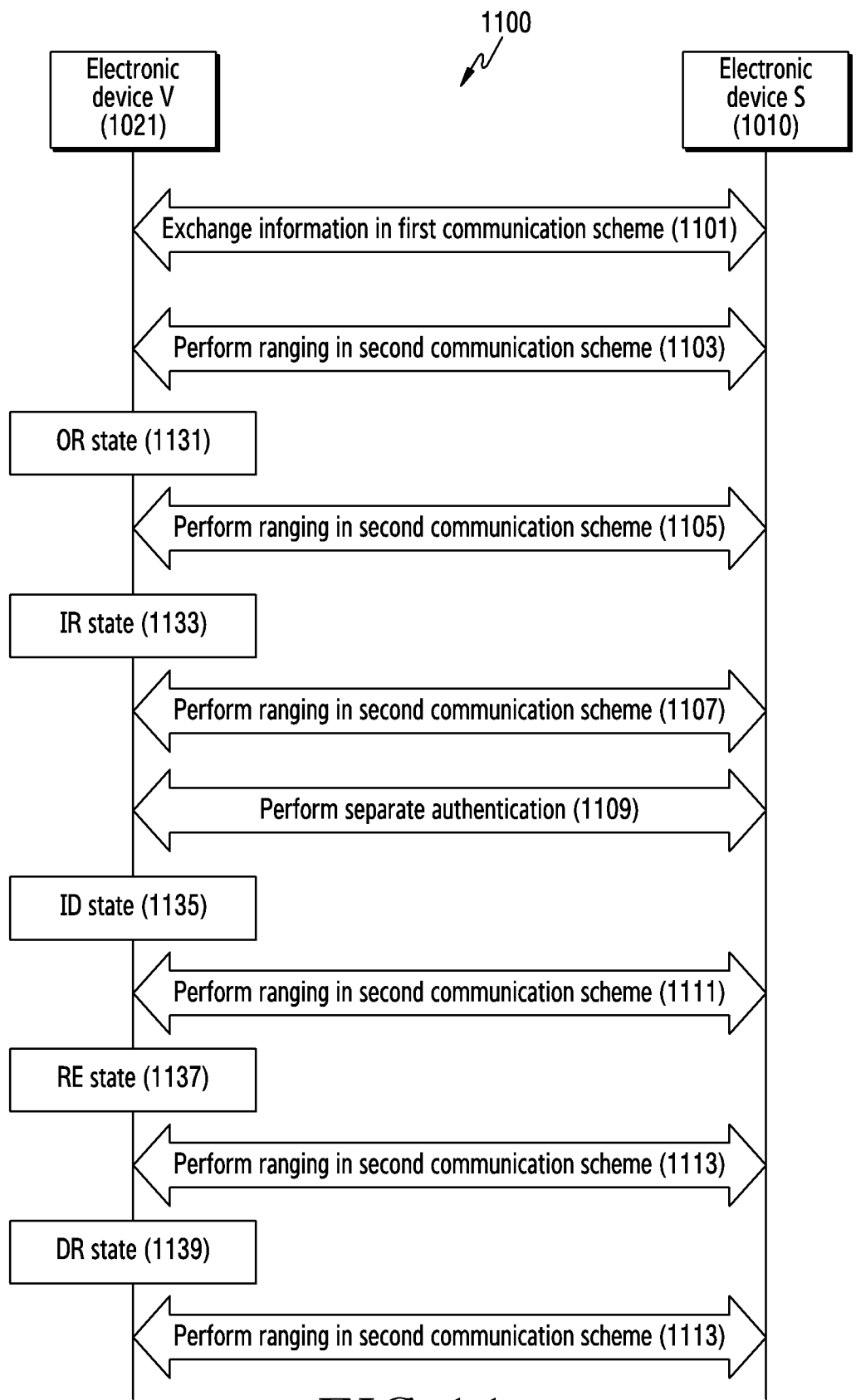
FIG. 11 is a diagram illustrating an operation for distance measurement and authentication between an electronic device V and an electronic device S in the situation of FIG. 10.

FIG. 10 is a diagram 1000 illustrating a situation where distance measurement and authentication are performed according to one or more embodiments. FIG. 11 is a diagram 1100 illustrating an operation for distance measurement and authentication between an electronic device V 1021 (e.g., an electronic device installed in a vehicle 1020 of the present disclosure) and an electronic device S 1010 (e.g., a smart phone or a smart key) in the situation of FIG. 10.

Referring to FIG. 10, in accordance with an embodiment, a user who owns the electronic device S 1020 (e.g., the smart phone or smart key) may move to the vehicle 1020 in order to activate the vehicle 1020. At this time, the electronic device V 1021 installed in the vehicle 1020 may perform distance measurement and authentication with the electronic device S 1010 (e.g., the smart phone or smart key), and may perform distance measurement by using a general preamble or a secure preamble according to a measured distance. Also, the electronic device V 1021 may perform additional separate authentication as well. At this time, the electronic device V 1021 installed in the vehicle 1020 and the electronic device S 1010 (e.g., the smart phone or smart key) may first communicate in a first communication scheme and set parameters for a second communication scheme, and may initiate the second communication scheme.

If taking a look at the whole process with reference to FIG. 11, one or more embodiments may be applied.

According to one or more embodiments, the electronic device V 1021 and the electronic device S 1010 may perform information exchange 1101 in the first communication scheme. Exchanged information may be information for providing information utilized for user authentication or device authentication. In an embodiment, the electronic device V 1021 may forward credential information capable of proving itself to the electronic device S 1010. Even the electronic device S 1010 receiving this may forward its own credential information to the electronic device V 1021. When transmitting their own credential information, the electronic device S 1010 and the electronic device V 1021 may encrypt their own credential information and transmit the encrypted credential information. The encryption may be performed by using a public key of the counterpart electronic device.

Also, the electronic device V 1021 and the electronic device S 1010 may exchange a parameter that will be applied in the second communication scheme which will be used for ranging or distance measurement. In response to using a UWB communication scheme as the second communication scheme, the electronic device V 1021 and the electronic device S 1010 may exchange the parameter such as a channel, a preamble code, a PRF or a data rate.

The information exchange using the first communication scheme between the electronic device V 1021 and the electronic device S 1010 may be possible in response to a distance between the two devices being a distance (e.g., a region 1031 of FIG. 10) in which communication is possible using the first communication scheme.

Next, the electronic device V 1021 and the electronic device S 1010 may initiate a second communication scheme and perform (1103) ranging or distance measurement. A distance measurement scheme may use an SS-TWR scheme illustrated in FIG. 7 or a DS-TWR scheme illustrated in FIG. 8.

The electronic device V 1021 may periodically measure a distance to the electronic device S 1010, while changing its own state according to the distance to the electronic device S 1010. In an embodiment, in response to the distance to the electronic device S 1010 getting less than a first set distance (e.g., a distance capable of including a region 1033 of FIG. 10), the electronic device V 1021 may be changed into an "out of range" (OR) state 1131. Also, in response to the distance to the electronic device S 1010 getting less than a second set distance (e.g., a distance capable of including a region 1035 of FIG. 10), the electronic device V 1021 may be changed into an "in range" (IR) state 1133. In response to distinguishing that the electronic device S 1010 is in a vehicle through distance measurement, the electronic device V 1021 may be changed into an "in door" (ID) state 1135. Also, in response to the electronic device S 1010 being in the vehicle while a vehicle engine starting, the electronic device V 1021 may be changed into a "run engine" (RE) state 1137. In response to detecting that the vehicle is moving, the electronic device V 1021 may be changed into a "drive" (DR) state 1139.

The electronic device V 1021 may periodically perform the ranging operation of steps 1103, 1105, 1107, 1111, or 1113 with the electronic device S 1010 in the above-described state change process. In accordance with each embodiment, a preamble or preamble code used at ranging between the electronic device V 1021 and the electronic device S 1010 may be a secure preamble or secure preamble code or be a general preamble or general preamble code.

In an embodiment, the electronic device V 1021 and the electronic device S 1010 may use a secure preamble or secure preamble code in all the ranging execution processes 1103, 1105, 1107, 1111, and 1113. Accordingly, the electronic device V 1021 and the electronic device S 1010 may authenticate a user who transmits a signal used for each ranging execution and therefore, may be protected from an external attack such as a relay attack.

In another embodiment, until the electronic device V 1021 is in the OR state 1131, the electronic device V 1021 and the electronic device S 1010 may use a general preamble or general preamble code in the ranging execution process 1103 or 1105. However, after the electronic device V 1021 is operative within the IR state 1133, the electronic device V 1021 and the electronic device S 1010 may use a secure preamble or secure preamble code in the ranging execution process 1107, 1111 or 1113. In response to the electronic device V 1021 being in the IR state 1133, there is a possibility in which a significant operation of the electronic device V 1021 is managed under the control of the electronic device S 1010, so there may be a need for a higher user authentication step. Accordingly, from when the electronic device V 1021 enters the IR state 1133, the electronic device V 1021 may use a secure preamble or secure preamble code in the ranging execution process 1107, 1111 or 1113.

In the above-described embodiment, a description has been made in which the electronic device V 1021 uses the secure preamble or secure preamble code from when the electronic device V 1021 is in the IR state 1133, but the disclosure is not limited to this example, and it is possible that the electronic device V 1021 uses the secure preamble or secure preamble code from when the electronic device V 1021 is in the OR state 1131 or from when the electronic device V 1021 is in the ID state 1135 as well.

In another embodiment, the electronic device V 1021 and the electronic device S 1010 may perform (1109) an additional separate authentication. For example, in response to the occurrence of a preset specific situation including a situation where a vehicle door may be opened or a situation where a vehicle engine may be operating, such as vehicle door open button pressing, door button pressing, door handle catching, engine button pressing, and a distance being within a specific range, the electronic device V 1021 may attempt additional authentication on the electronic device S 1010 to improve security. According to another embodiment, a preset specific situation may be set differently according to a position of the electronic device V 1021, and a current time. For example, a distance where a specific situation may occur may be set differently according to whether the position of the electronic device V 1021 is a parking lot of a house or is a parking lot of a mart. In another example, the distance where the specific situation may occur may be set differently according to whether the current time is daylight or is night as well. This additional authentication may be carried out in the first communication scheme, not the second communication scheme. In an embodiment, the additional authentication may be conventional user authentication for authenticating a user by using Bluetooth low energy (BLE).

In response to the ranging process 1103, 1105, 1107, 1111 or 1113 of FIG. 11 using the secure preamble or secure preamble code, and authentication by this failing, communication for distance measurement may be terminated and a failure of distance measurement may be notified.

According to one or more embodiments, the processor 420 may enable an operation utilizing security to be carried out in the TEE 320 region illustrated in FIG. 3. In an embodiment, the processor 420 may control to perform, in the TEE 320 region, an operation of providing credential information and encrypting the credential information with a public key or decoding credential information of a received signal with a private key. Also, the processor 420 may control to perform, in the TEE 320 region, even an operation of providing a secure preamble and an operation of comparing the secure preamble provided in itself with a secure preamble of a received signal and authenticating an external electronic device.

The above-mentioned operation of performing distance measurement and authentication concurrently may be implemented in various electronic devices. In an embodiment, the operation proposed in the present disclosure may be implemented in a user device such as a wearable device, a smart phone or a smart key, and a vehicle and, in response to a legal user arriving at a specific range around the vehicle, may perform various controls related to the vehicle after acquiring authentication. In another embodiment, the operation proposed in the present disclosure may be implemented between a wearable device of a user and a notebook computer and, in response to there being an authenticated user within a specific range, may release a locking state of the notebook computer. In a further embodiment, the operation proposed in the present disclosure may be implemented between the wearable device of the user or a wireless key and a door lock and, in response to the user or the wireless key being in a specific range and authentication being completed, may be used for opening a door automatically.

According to one or more embodiments, an electronic device (e.g., the electronic device 101 of FIG. 1 or the electronic device 401 of FIG. 4) may include a communication module (e.g., the communication module 190 of FIG. 1) performing communication with an external electronic device (e.g., a smart key, a car, a door lock, or a notebook), at least one processor (e.g., the processor 120 of FIG. 1 or the processor 420 of FIG. 4) operably connected with the communication module, and at least one memory (e.g., the memory 130 of FIG. 1) operably connected with the at least one processor. The at least one memory may store instructions of, at execution, enabling the at least one processor to acquire a secure preamble, and control the communication module to transmit a distance measurement signal including the secure preamble to the external electronic device, and control the communication module to receive a response signal including a secure preamble of the external electronic device from the external electronic device, and authenticate the response signal of the external electronic device on the basis of the secure preamble of the external electronic device obtained from the received response signal, and in response to the authentication succeeding, determine a distance to the external electronic device on the basis of a transmission time of the distance measurement signal and a reception time of the response signal.

According to one or more embodiments, the instructions may enable the at least one processor to, in response to the authentication succeeding, control the communication module to additionally transmit a final signal including the secure preamble to the external electronic device.

According to one or more embodiments, the instructions may enable the at least one processor to, to acquire the secure preamble, provide first credential information, and transmit the first credential information to the external electronic device, and receive second credential information of the external electronic device from the external electronic device, and provide the secure preamble on the basis of at least part of the first credential information and the second credential information.

According to one or more embodiments, the communication module may include a first communication module and a second communication module, and the instructions may enable the at least one processor to transmit and receive signals utilized for providing the secure preamble through the first communication module, and transmit the distance measurement signal and receive the response signal, through the second communication module.

According to one or more embodiments, the instructions may enable the at least one processor to provide a different secure preamble on the basis of at least part of the first credential information and the second credential information according to a predefined rule whenever transmitting a signal to the external electronic device.

According to one or more embodiments, the instructions may enable the at least one processor to encrypt the first credential information with a public key of the external electronic device and transmit the encrypted credential information to the external electronic device, and receive credential information encrypted with a public key of the electronic device from the external electronic device, and decode the encrypted credential information with a private key of the electronic device and acquire the second credential information.

According to one or more embodiments, the instructions may enable the at least one processor to control the communication module to measure a distance with the external electronic device by using signals including general preambles, and distinguish whether the measured distance meets a previously specified condition or whether a first event has been received, and in response to the measured distance meeting the previously specified condition or the first event having been received as the distinction result, transmit a distance measurement signal including the secure preamble to the external electronic device through the communication module, and receive a response signal including a secure preamble of the external electronic device from the external electronic device through the communication module, and authenticate the response signal of the external electronic device on the basis of the secure preamble of the external electronic device obtained from the received response signal, and in response to the authentication succeeding, determine a distance to the external electronic device on the basis of a transmission time of the distance measurement signal and a reception time of the response signal.

According to one or more embodiments, the instructions may enable the at least one processor to, while performing the authentication and distance measurement by using the signals including the secure preamble, distinguish whether a second event has been received, and in response to the second event having been received as the distinction result, perform a separate authentication procedure with the external electronic device.

According to one or more embodiments, an electronic device (e.g., the electronic device 101 of FIG. 1, the electronic device 401 of FIG. 4, a smart key, a car, a door lock, or a notebook) may include a communication module (e.g., the communication module 190 of FIG. 1) performing communication with an external electronic device (e.g., the electronic device 102 of FIG. 1, the electronic device 401 of FIG. 4, a smart key, a car, a door lock, or a notebook), at least one processor (e.g., the processor 120 of FIG. 1 or the processor 420 of FIG. 4) operably connected with the communication module, and at least one memory (e.g., the memory 130 of FIG. 1) operably connected with the at least one processor. The at least one memory may store instructions of, at execution, enabling the at least one processor to acquire a secure preamble, and receive a distance measurement signal including a secure preamble of the external electronic device from the external electronic device, through the communication module, and authenticate the distance measurement signal on the basis of the secure preamble of the external electronic device included in the received distance measurement signal, and in response to the authentication succeeding, control the communication module to transmit a response signal including the secure preamble to the external electronic device.

According to one or more embodiments, the instructions may enable the at least one processor to control the communication module to receive a final signal from the external electronic device, and authenticate the final signal on the basis of a secure preamble of the external electronic device included in the received final signal, and in response to the authentication succeeding, determine a distance to the external electronic device on the basis of a transmission time of the response signal and a reception time of the final signal.

According to one or more embodiments, the instructions may enable the at least one processor to, to acquire the secure preamble, receive first credential information of the external electronic device from the external electronic device, and provide second credential information, and transmit the second credential information to the external electronic device, and provide the secure preamble on the basis of at least part of the first credential information and the second credential information.

According to one or more embodiments, the communication module may include a first communication module and a second communication module, and the instructions may enable the at least one processor to transmit and receive signals utilized for providing the secure preamble through the first communication module, and receive the distance measurement signal and transmit the response signal, through the second communication module.

According to one or more embodiments, the instructions may enable the at least one processor to receive the first credential information encrypted with a public key of the electronic device, and decode the encrypted first credential information with a private key of the electronic device and acquire the first credential information, and transmit the second credential information encrypted with a public key of the external electronic device, to the external electronic device.

According to one or more embodiments, the instructions enable the at least one processor to receive a distance measurement signal including a general preamble from the external electronic device through the communication module, and in response to the received distance measurement signal, transmit a response signal including the general preamble through the communication module.

According to one or more embodiments, the instructions may enable the at least one processor to additionally perform a separate authentication procedure with the external electronic device.

According to one or more embodiments, an electronic device (e.g., the electronic device 101 of FIG. 1 or the electronic device 401 of FIG. 4) may include a communication module (e.g., the communication module 190 of FIG.

1) performing communication with an external electronic device (e.g., a smart key, a car, a door lock, or a notebook), at least one processor (e.g., the processor 120 of FIG. 1 or the processor 420 of FIG. 4) operably connected with the communication module, and at least one memory (e.g., the memory 130 of FIG. 1) operably connected with the at least one processor. The at least one memory may store instructions of, at execution, enabling the at least one processor to acquire a secure preamble, and measure a distance with the external electronic device by using signals including general preambles, and distinguish whether the measured distance meets a previously specified condition or whether a first event has been received, and in response to the measured distance meeting the previously specified condition or the first event having been received as the distinction result, perform authentication and distance measurement by using signals including the secure preamble.

According to one or more embodiments, the instructions may enable the at least one processor to while performing the authentication and distance measurement by using the signals including the secure preamble, distinguish whether a second event has been received, and in response to the second event having been received as the distinction result, perform a separate authentication procedure with the external electronic device.

Below, a description is made for a method for performing authentication and distance measurement by using the electronic device 101 described above.

Figure 12:
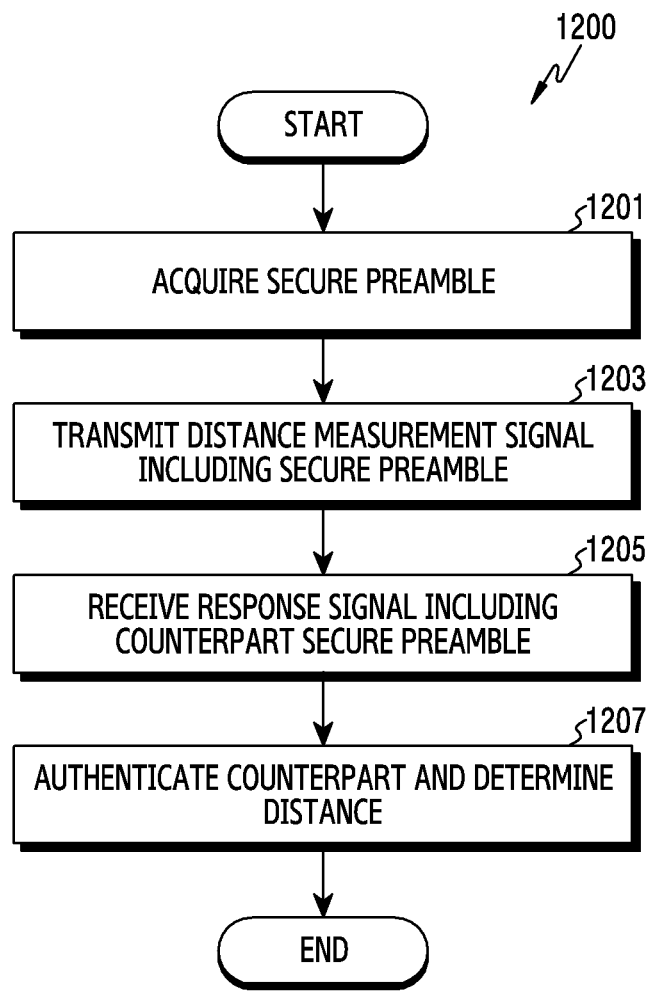
FIG. 12 is a flowchart illustrating an authentication and distance determination operation in an electronic device initiating distance measurement according to one or more embodiments.

FIG. 12 is a flowchart 1200 illustrating an authentication and distance determination operation in an electronic device initiating distance measurement according to one or more embodiments. An operation subject of the flowchart 1200 exemplified in FIG. 12 may be understood as an electronic device (e.g., the electronic device 101 of FIG. 1 or the electronic device 401 of FIG. 4) or a processor (e.g., the processor 120 of FIG. 1 or the processor 420 of FIG. 4) of the electronic device.

According to one or more embodiments, in operation 1201, the electronic device 101 or 401 may acquire a secure preamble code and provide a secure preamble accordingly. The secure preamble code or secure preamble may be used to prove mutual identifications between the electronic device 101 or 401 and a counterpart electronic device (e.g., the electronic device 102 of FIG. 1 or the electronic device V 1021 installed in the vehicle 1020 of FIG. 10) that is a distance measurement target. In an embodiment, in distance measurement between a vehicle (e.g., the vehicle 1020 of FIG. 10) and a smart key (e.g., the electronic device S 1010 of FIG. 10), the vehicle and the smart key may provide each secure preamble and forward the provided secure preamble to the counterpart, and the vehicle may identify whether the smart key is a smart key of a legal user by using the received secure preamble of the smart key, and the smart key may identify whether it is a signal coming from a legal vehicle interlocked with itself by using the secure preamble of the vehicle.

The electronic device 101 or 401 may acquire a secure preamble code by using various methods. According to an embodiment, the electronic device 101 or 401 may acquire a secure preamble code previously set at manufacturing and secure preamble code information of a corresponding counterpart electronic device, and store the same. In an embodiment, a vehicle and a smart key used for handling the vehicle may be shipped and delivered to a user with its own secure preamble code and a counterpart's secure preamble code previously set. According to another embodiment, the electronic device 101 or 401 may download and acquire a secure preamble code from an external server (e.g., the server 108 of FIG. 1). In this case, the electronic device 101 or 401 may download one-time secure preamble code as well, and may download a secure preamble code usable for a predetermined period, or may download a secure preamble code usable permanently as well. According to a further embodiment, the electronic device 101 or 401 may include a secure preamble code provider identical with that of a counterpart electronic device (e.g., the electronic device 102 of FIG. 1 or the electronic device V 1021 installed in the vehicle 1020 of FIG. 10). The secure preamble code provider may provide a temporary secure preamble code on the basis of a provided time and an initial value. In response to the corresponding both electronic devices having the same secure preamble code provider and initial value, the electronic device 101 or 401 may provide the same temporary secure preamble code at a similar time. According to a yet another embodiment, the electronic device 101 or 401 may exchange credential information with the counterpart electronic device and, on the basis of this, may provide and acquire a secure preamble code as well. On the basis of the acquired secure preamble code, the electronic device 101 or 401 may provide a secure preamble according to an embodiment illustrated in FIG. 5B.

According to one or more embodiments, in operation 1203, the electronic device 101 or 401 may transmit a distance measurement signal including the provided secure preamble to the counterpart electronic device. The distance measurement signal may have the frame structure mentioned in FIG. 5A or FIG. 9. FIG. 5A is the same frame structure as the conventional frame structure used for distance measurement, and the secure preamble may be positioned in the preamble field 511 of the SHR field 510. FIG. 9 is a newly proposed frame structure usable for distance measurement, and the secure preamble may be positioned in the secure preamble field 970 newly added.

According to one or more embodiments, in operation 1205, in response to the transmitted distance measurement signal, the electronic device 101 or 401 may receive a response signal from the counterpart electronic device. The received response signal may include a secure preamble or secure preamble code capable of authenticating the counterpart electronic device. The counterpart electronic device may obtain a secure preamble or secure preamble code from the distance measurement signal received from the electronic device 101 or 401 and, in response to the secure preamble or secure preamble code being a normal value, the counterpart electronic device may transmit the response signal including its own secure preamble to the electronic device 101 or 401 responsively to the received distance measurement signal. The secure preamble code of the counterpart electronic device and the secure preamble code of the electronic device 101 or 401 may be the same as or be different from each other according to an acquisition scheme.

According to one or more embodiments, in operation 1207, the electronic device 101 or 401 may obtain the secure preamble or secure preamble code from the response signal received from the counterpart electronic device, and may distinguish whether the secure preamble or the secure preamble code is a normal value, thereby authenticating the counterpart electronic device. In an embodiment, the electronic device 101 or 401 may compare the secure preamble code obtained from the received response signal and a previously acquired secure preamble code of the counterpart electronic device and in response to being identical, the electronic device 101 or 401 may authenticate the counterpart electronic device. And, in response to the counterpart electronic device being authenticated, the electronic device 101 or 401 may determine a distance to the counterpart electronic device on the basis of data included in the received distance measurement signal. In an embodiment, the electronic device 101 or 401 may perform a ToF-based distance measurement scheme, and in more detail, may measure a distance by using the SS-TWR illustrated in FIG. 7 or the DS-TWR scheme illustrated in FIG. 8. In using the DS-TWR scheme, in operation 1205, the electronic device 101 or 401 may receive the response signal. In operation 1207, the electronic device 101 or 401 may complete counterpart's authentication and distance determination and thereafter, additionally transmit a final signal to the counterpart electronic device. According to another embodiment, the additional transmitting of the final signal may be performed after the completing of authentication on the counterpart electronic device and before the initiating of the distance determination as well.

According to an embodiment, the electronic device 101 or 401 may perform operation 1203 to operation 1207 one time. In response to the counterpart electronic device being authenticated and the distance being determined in operation 1203 to operation 1207, the electronic device 101 or 401 may terminate the operation for measuring a distance. However, in response to failing to receive the response signal from the counterpart electronic device within a previously set specific time after operation 1203 of transmitting the distance measurement signal, or in response to failing in authentication although receiving the response signal, the electronic device 101 or 401 may again perform the distance measurement signal transmission of operation 1203 at least one time or more. And, in response to failing to receive the response signal or failing in authentication continuously as many as a previously set number, the electronic device 101 or 401 may terminate further distance measurement.

According to another embodiment, the electronic device 101 or 401 may periodically perform operation 1203 to operation 1207. For example, the electronic device 101 or 401 may perform the distance measurement signal transmission of operation 1203, the response signal reception of operation 1205, and the authentication and distance determination of operation 1207, repeatedly, according to a previously set specific period of time. According to a further embodiment, as illustrated in FIG. 7 or FIG. 8, the electronic device 101 or 401 may notify a time for transmitting a next distance measurement signal. By using this, the both electronic devices performing distance measurement may control a time interval of attempting distance determination.

According to a further embodiment, the distance determination of operation 1203 to operation 1207 of the electronic device 101 or 401 may be repeatedly performed, and be terminated in response to the occurrence of a previously specified situation, for example, in response to the occurrence of a situation where a vehicle door is opened, a situation where a vehicle engine starts, a situation where a determined distance is within a previously defined specific value, or a situation where the determined distance is greater than a previously defined another specific value.

Figure 13:
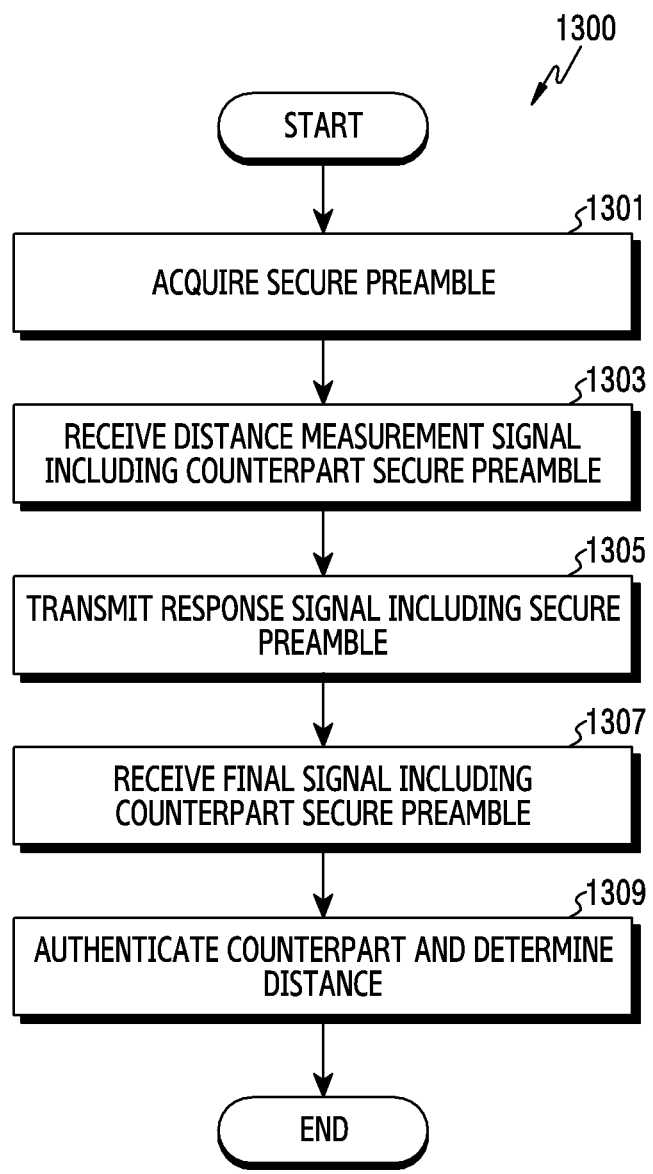
FIG. 13 is a flowchart illustrating an operation of authentication and distance determination of a counterpart electronic device in an electronic device that is a distance measurement target according to one or more embodiments.

FIG. 13 is a flowchart 1300 illustrating an operation of authentication and distance determination of a counterpart electronic device in an electronic device that is a distance measurement target according to one or more embodiments. An operation subject of the flowchart 1300 exemplified in FIG. 13 may be understood as the electronic device (e.g., the electronic device 101 of FIG. 1 or the electronic device 401 of FIG. 4) or a processor (e.g., the processor 120 of FIG. 1 or the processor 420 of FIG. 4) of the electronic device.

According to one or more embodiments, in operation 1301, the electronic device 101 or 401 may acquire a secure preamble code and generate a secure preamble accordingly. The secure preamble code or secure preamble may be used to prove mutual identifications between the electronic device 101 or 401 and the counterpart electronic device (e.g., the electronic device 102 of FIG. 1 or the electronic device V 1021 installed in the vehicle 1020 of FIG. 10) initiating distance measurement. In an embodiment, in distance measurement between a vehicle (e.g., the vehicle 1020 of FIG. 10) and a smart key (e.g., the electronic device S 1010 of FIG. 10), the vehicle and the smart key may provide each secure preamble and forward the provided secure preamble to the counterpart electronic device, and the vehicle may identify whether the smart key is a smart key of a legal user by using the secure preamble of the smart key, and the smart key may identify whether it is a signal coming from a legal vehicle interlocked with itself by using the secure preamble of the vehicle.

The electronic device 101 or 401 may acquire a secure preamble code by using various methods. According to an embodiment, the electronic device 101 or 401 may acquire a secure preamble code previously set at manufacturing and secure preamble code information of a corresponding counterpart electronic device, and store the same. In an embodiment, a vehicle and a smart key used for handling the vehicle may be shipped and delivered to a user with its own secure preamble code and a secure preamble code of a counterpart electronic device previously set. According to another embodiment, the electronic device 101 or 401 may download and acquire a secure preamble code from an external server (e.g., the server 108 of FIG. 1). In this case, the electronic device 101 or 401 may download one-time secure preamble code as well, and may download a secure preamble code usable for a predetermined period, or may download a secure preamble code usable permanently as well. According to a further embodiment, the electronic device 101 or 401 may include a secure preamble code provider identical with that of the counterpart electronic device. The secure preamble code provider may provide a temporary secure preamble code on the basis of a provided time and an initial value. In response to the corresponding both electronic devices having the same secure preamble code provider and initial value, the electronic device 101 or 401 may provide the same temporary secure preamble code at a similar time. According to a yet another embodiment, the electronic device 101 or 401 may exchange credential information with the counterpart electronic device and provide and acquire a secure preamble code as well. On the basis of the acquired secure preamble code, the electronic device 101 or 401 may provide a secure preamble according to an embodiment illustrated in FIG. 5B.

According to one or more embodiments, in operation 1303, the electronic device 101 or 401 may receive a distance measurement signal including a secure preamble of the counterpart electronic device from the counterpart electronic device that initiated distance measurement. The distance measurement signal may have the frame structure mentioned above in FIG. 5A or FIG. 9. FIG. 5A is the same frame structure as the conventional frame structure used for distance measurement, and the secure preamble may be positioned in the preamble field 511 of the SHR field 510. FIG. 9 is a newly proposed frame structure usable for distance measurement, and the secure preamble may be positioned in the secure preamble field 970 newly added.

According to one or more embodiments, in operation 1305, in response to the distance measurement signal received from the counterpart electronic device, the electronic device 101 or 401 may transmit a response signal to the counterpart electronic device. The received distance measurement signal may include a secure preamble capable of proving the counterpart electronic device. In an embodiment, the electronic device 101 or 401 may compare a secure preamble or secure preamble code obtained from the received distance measurement signal and a secure preamble or secure preamble code of the counterpart electronic device acquired by itself, and authenticate whether the distance measurement signal has been transmitted from a legal user. In response to succeeding in authentication, the electronic device 101 or 401 may transmit the response signal including its own secure preamble to the counterpart electronic device responsively to the received distance measurement signal. The secure preamble code of the counterpart electronic device and the secure preamble of the electronic device 101 or 401 may be the same as or be different from each other according to an acquisition scheme.

In response to the electronic device 101 or 401 operating in the SS-TWR scheme for the sake of distance measurement, operation 1307 and operation 1309 may not be executed, and the electronic device 101 or 401 may not determine a distance with the counterpart electronic device. In response to the electronic device 101 or 401 operating in the DS-TWR scheme for the sake of distance measurement, the electronic device 101 or 401 may execute operation 1307 and operation 1309, and determine a distance to the counterpart electronic device.

According to one or more embodiments, in operation 1307, in response to the response signal transmitted in operation 1305, the electronic device 101 or 401 may receive a final signal from the counterpart electronic device. The final signal may include a secure preamble of the counterpart electronic device. The secure preamble included in the distance measurement signal received in operation 1303 and the secure preamble included in the final signal received in operation 1307 may be different from each other according to an embodiment, and may be the same as each other according to another embodiment.

According to one or more embodiments, in operation 1309, the electronic device 101 or 401 may obtain a secure preamble or secure preamble code from the final signal received from the counterpart electronic device, and may distinguish whether the secure preamble or the secure preamble code is a normal value, and authenticate the counterpart electronic device based on detecting the normal value. And, in response to the counterpart electronic device having transmitted the final signal being authenticated, the electronic device 101 or 401 may determine a distance to the counterpart electronic device on the basis of data included in the received final signal.

According to one or more embodiments, the electronic device 101 or 401 may determine a distance to the counterpart electronic device and control its own operation on the basis of the distance to the counterpart electronic device. In an embodiment, in response to the electronic device 101 or 401 being a door lock, the electronic device 101 or 401 may perform an operation of opening a door automatically in response to the distance to the counterpart electronic device (e.g., the door key or smart phone) being a previously set first distance or less, and may perform an operation of closing the door automatically in response to the distance to the counterpart electronic device being equal to or being greater than a previously set second distance. In another embodiment, in response to the electronic device 101 or 401 being a notebook computer, the electronic device 101 or 401 may perform an operation of releasing a locked screen in response to the distance to the counterpart electronic device (e.g., the smart phone) being a previously set third distance or less, and may perform an operation of automatically changing a screen into a lock state or turning OFF a power source in response to the distance to the counterpart electronic device being equal to or being greater than a previously set fourth distance. In a further embodiment, in response to the electronic device 101 or 401 being a vehicle, the electronic device 101 or 401 may perform an operation of responding to a control signal (e.g., door opening or engine starting) coming from the counterpart electronic device in response to the distance to the counterpart electronic device (e.g., the smart key or smart phone) being a previously set fifth distance or less, and may perform an operation of closing the door automatically in response to the distance to the counterpart electronic device being equal to or being greater than a previously set sixth distance.

Figure 14:
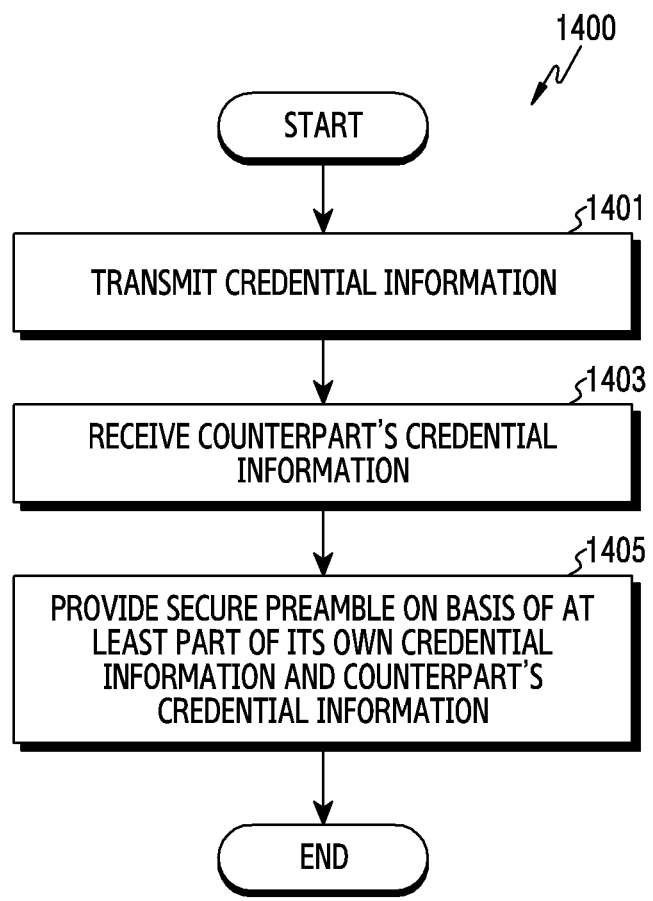
FIG. 14 is a flowchart illustrating an operation of acquiring a secure preamble code according to one or more embodiments.

FIG. 14 is a flowchart 1400 illustrating an operation of acquiring a secure preamble code according to one or more embodiments. An operation subject of the flowchart 1400 exemplified in FIG. 14 may be understood as an electronic device (e.g., the electronic device 101 of FIG. 1 or the electronic device 401 of FIG. 4) or a processor (e.g., the processor 120 of FIG. 1 or the processor 420 of FIG. 4) of the electronic device. The operation of FIG. 14 may be an embodiment of acquiring the secure preamble of operation 1201 of FIG. 12 or operation 1301 of FIG. 13.

The electronic device 101 or 401 may acquire a secure preamble code in various methods. FIG. 14 illustrates an embodiment which uses a public key encryption scheme among them.

According to one or more embodiments, in operation 1401, the electronic device 101 or 401 may provide and transmit credential information to a counterpart electronic device (e.g., the electronic device 102 of FIG. 1 and the electronic device V 1021 installed in the vehicle 1020 of FIG. 10). In an embodiment, the electronic device 101 or 401 may encrypt its own credential information with a public key of the counterpart electronic device previously received from the counterpart electronic device, and transmit the encrypted credential information to the counterpart electronic device. The counterpart electronic device receiving the encrypted credential information may decode a received signal including the encrypted credential information by using its own private key, and acquire the credential information. According to an embodiment, the electronic device 101 or 401 may encrypt and transmit the credential information to the counterpart electronic device such that the counterpart electronic device may decode the credential information.

According to one or more embodiments, in operation 1403, the electronic device 101 or 401 may receive credential information of the counterpart electronic device. The credential information of the counterpart electronic device may be encrypted with a public key of the electronic device 101 or 401 and received. The electronic device 101 or 401 may decode the received encrypted credential information by its own private key, and acquire the credential information of the counterpart electronic device.

According to one or more embodiments, in operation 1405, the electronic device 101 or 401 may provide a secure preamble code, on the basis of at least part of its own credential information (e.g., below, "first" credential information) and the credential information (e.g., below, "second" credential information) of the counterpart electronic device. In an embodiment, the electronic device 101 or 401 may provide the secure preamble code, on the basis of at least part of the first credential information and the second credential information and by using a symmetric key provision algorithm (for example, AES 128). And, on the basis of this secure preamble code, the electronic device 101 or 401 may provide a secure preamble according to a scheme illustrated in FIG. 5B. In an embodiment, in response to the first credential information being a 128-bit key value, and the second credential information being a 128-bit plain text, the electronic device 101 or 401 may provide an inherent 128-bit cipher text by using an AES encryption algorithm on the basis of these two credential information, and the electronic device 101 or 401 may process this 128-bit cipher text and provide the secure preamble code. In an embodiment, the electronic device 101 or 401 may provide a secure preamble code of a previously set length, by taking a part of the 128-bit cipher text or taking a part after performing a process such as scrambling, etc.

According to one or more embodiments, in operation 1405, the electronic device 101 or 401 may change a parameter according to a defined rule every signal transmission, thereby varying the provided secure preamble code, and including and transmitting a secure preamble provided on the basis of the varied secure preamble code, every signal transmission.

According to one or more embodiments, by using a first communication scheme, the electronic device 101 or 401 may perform credential information transmission and counterpart's credential information reception of operation 1401 and operation 1403. The first communication scheme may be Bluetooth, WiFi, UWB, or LF, and may use the same scheme as the second communication scheme for transmitting a signal for distance measurement. But, the first communication scheme may use a scheme different from the second communication scheme according to another embodiment.

Figure 15:
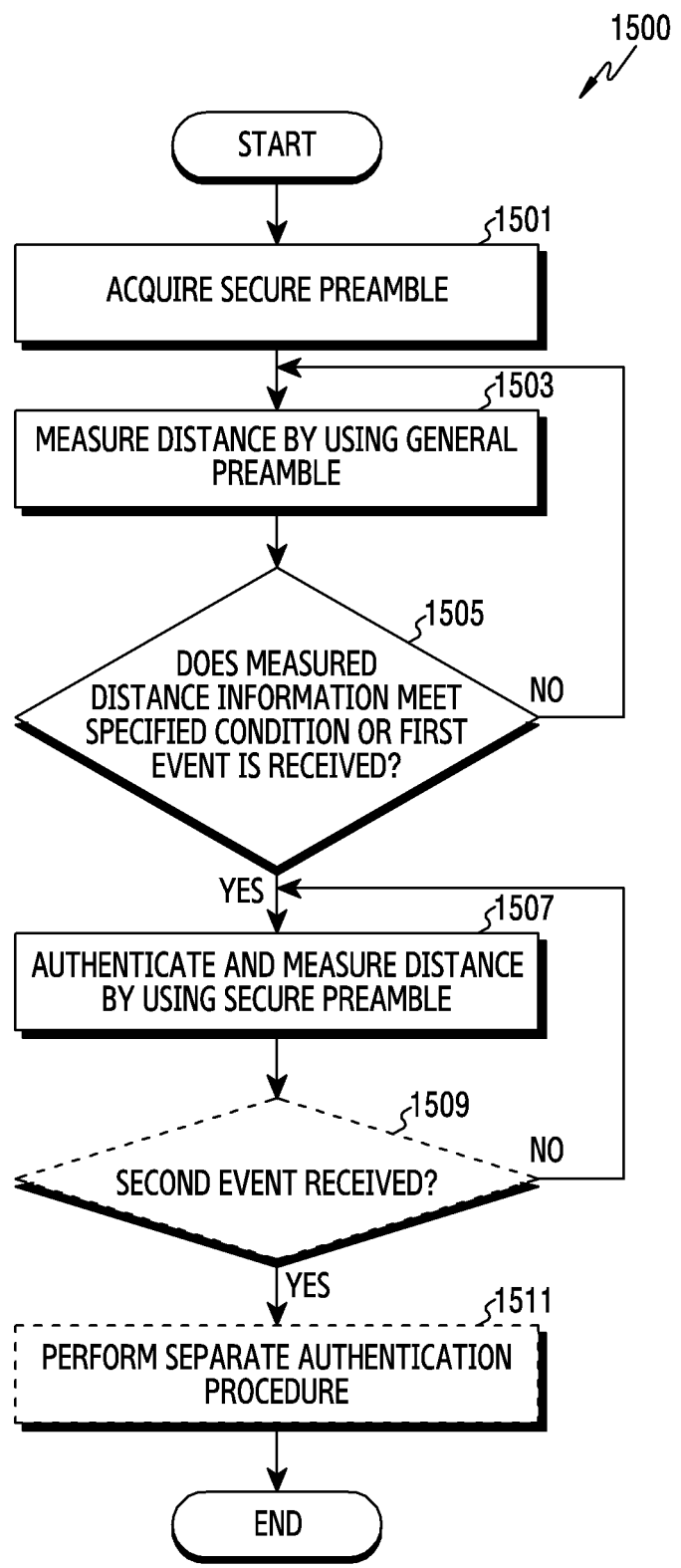
FIG. 15 is a flowchart illustrating an operation of performing authentication and distance determination in a specific condition in an electronic device initiating distance measurement according to one or more embodiments.

FIG. 15 is a flowchart 1500 illustrating an operation of performing authentication and distance determination in a specific condition in an electronic device initiating distance measurement according to one or more embodiments. An operation subject of the flowchart 1500 exemplified in FIG. 15 may be understood as an electronic device (e.g., the electronic device 101 of FIG. 1 or the electronic device 401 of FIG. 4) or a processor (e.g., the processor 120 of FIG. 1 or the processor 420 of FIG. 4) of the electronic device.

According to one or more embodiments, in operation 1501, the electronic device 101 or 401 may acquire a secure preamble code and by using this, provide a secure preamble. The secure preamble code or secure preamble may be used to prove mutual identifications between the electronic device 101 or 401 and a counterpart electronic device (e.g., the electronic device 102 of FIG. 1 or the electronic device V 1021 installed in the vehicle 1020 of FIG. 10) that is a distance measurement target. In an embodiment, in distance measurement between a vehicle (e.g., the vehicle 1020 of FIG. 10) and a smart key (e.g., the smart key 1010 of FIG. 10), the vehicle and the smart key may provide each secure preamble and forward the provided secure preamble to the counterpart electronic device, and the vehicle may identify whether the smart key is a smart key of a legal user by using the secure preamble of the smart key, and the smart key may identify whether it is a signal coming from a legal vehicle interlocked with itself by using the secure preamble of the vehicle.

The electronic device 101 or 401 may acquire a secure preamble code by using various methods. According to an embodiment, the electronic device 101 or 401 may acquire a secure preamble code previously set at manufacturing and secure preamble code information of a corresponding counterpart electronic device, and store the same. According to an embodiment, a vehicle and a smart key used for handling the vehicle, or a door lock and a door key capable opening the door lock may be shipped and delivered to a user with its own secure preamble code and a counterpart's secure preamble code previously set. In another embodiment, in a hotel, a hotel manager may set a secure preamble code capable of opening a door of a hotel room assigned to a guest, to a portable phone of the corresponding guest. According to a further embodiment, the electronic device 101 or 401 may download and acquire a secure preamble code from an external server (e.g., the server 108 of FIG. 1). In this case, the electronic device 101 or 401 may download one-time secure preamble code as well, and may download a secure preamble code usable for a predetermined period, or may download a secure preamble code usable permanently as well. According to a further embodiment, the electronic device 101 or 401 may include a secure preamble code provider identical with that of the counterpart electronic device. The secure preamble code provider may provide a temporary secure preamble code on the basis of a provided time and an initial value. In response to the corresponding both electronic devices having the same secure preamble code provider and initial value, the electronic device 101 or 401 may provide the same temporary secure preamble code at a similar time. According to a yet another embodiment, as illustrated in FIG. 14, the electronic device 101 or 401 may exchange credential information with the counterpart electronic device and provide and acquire a secure preamble code as well. On the basis of the acquired secure preamble code, the electronic device 101 or 401 may provide a secure preamble according to an embodiment illustrated in FIG. 5B.

According to one or more embodiments, in operation 1503, the electronic device 101 or 401 may measure a distance with the counterpart electronic device by using a signal including a general preamble, which is distinct from the secure preamble provided in operation 1501. A distance measurement method may use any one of the SS-TWR scheme illustrated in FIG. 7 or the DS-TWR scheme illustrated in FIG. 8. In accordance with the used scheme, signals transmitted by the electronic device 101 or 401 and the counterpart electronic device may be different from each other, but each transmitted signal may include the general preamble, not the secure preamble.

According to another embodiment, the electronic device 101 or 401 may not perform operation 1503. According to this embodiment, after acquiring the secure preamble in operation 1501 through a signal exchange with the counterpart electronic device using the first communication scheme or through other schemes, in operation 1505, the electronic device 101 or 401 may detect whether a first event is received without distance measurement. According to this embodiment, the electronic device 101 or 401 may initiate distance measurement and authentication with the counterpart electronic device by using the secure preamble from after a previously set event occurs.

According to a further embodiment, the electronic device 101 or 401 may perform communication with the counterpart electronic device by using the first communication scheme, instead of the distance measurement using the general preamble in operation 1503. In an embodiment, the electronic device 101 or 401 may transmit, to the counterpart electronic device, a "PING" message or a "KEEP ALIVE" message for identifying whether the counterpart electronic device has been connected by using the first communication scheme, and receive a response signal from the counterpart electronic device. According to this embodiment, the electronic device 101 or 401 may identify whether the counterpart electronic device exists by using the first communication scheme before a previously set event occurs, and the electronic device 101 or 401 may initiate distance measurement and authentication with the counterpart electronic device by using the secure preamble from after the previously set event occurs.

According to one or more embodiments, in operation 1505, the electronic device 101 or 401 may distinguish whether distance information measured in operation 1503 meets a specified condition, or whether a previously specified first event such as reception of a control message 'vehicle door opening' has been received. In response to the distance information not meeting the specified condition and also the previously specified first event not being received as the distinction result, the electronic device 101 or 401 may return to operation 1503 and continuously or periodically measure a distance with the counterpart electronic device by using a signal including a general preamble, or may continuously distinguish that the first event is received without the distance measurement of operation 1503 according to another embodiment. In response to the distance information meeting the specified condition or the previously specified first event having been received as the distinction result, in operation 1507, the electronic device 101 or 401 may perform authentication and distance measurement concurrently by using a signal including a secure preamble.

According to one or more embodiments, in operation 1507, the electronic device 101 or 401 may perform the authentication and distance measurement by using the signal including the secure preamble according to operations 1203 to 1207 of FIG. 12. In accordance with an embodiment, before performing the authentication and distance measurement by using the signal including the secure preamble, the electronic device 101 or 401 may previously forward information that it will use the signal including the secure preamble, to the counterpart electronic device, by using the first communication scheme or the second communication scheme as well. The electronic device 101 or 401 may one time, periodically or continuously perform the authentication and distance measurement of operation 1507. In an embodiment, the electronic device 101 or 401 may one-time measure a distance and authenticate the counterpart electronic device, and perform an operation associated with a received event or perform an operation to perform in response to the distance information meeting the specified condition. In another embodiment, until a previously set ending condition is met, the electronic device 101 or 401 may periodically or continuously perform the authentication and distance measurement with the counterpart electronic device. The previously set ending condition may be that a measured distance is a first distance or less (for example, to specify that it is within a vehicle) or the measured distance is a second distance or more (for example, to specify that a driver parks and is far away).

According to one or more embodiments, the electronic device 101 or 401 may selectively perform operation 1509 and/or operation 1511 while performing the authentication and distance measurement by using the signal including the secure preamble. In operation 1509, the electronic device 101 or 401 may distinguish whether a previously set second event has been received. The previously set second event may be an event indicating a situation where a vehicle door may be opened or a situation where a vehicle engine may start, such as vehicle door open button pressing, door button pressing, door handle catching, engine button pressing, or a distance being narrowed within a predetermined range.

In response to the second event not being received as the distinction result, the electronic device 101 or 401 may return to operation 1507 and perform the authentication and distance measurement by using the signal including the secure preamble. In response to the second event having been received as the distinction result, in operation 1511, the electronic device 101 or 401 may perform a separate authentication procedure, in addition to the executed authentication procedure which was completed using the secure preamble. The separate authentication procedure may be performed using the second communications scheme as well, and according to another embodiment, the separate authentication procedure may be performed using the first communication scheme as well. Also, a signal used in the separate authentication procedure may be different from a signal used for distance measurement. According to an embodiment, the separate authentication procedure may be the conventional user authentication scheme of authenticating a user by using the first communication scheme (e.g., BLE).

According another embodiment, although it is distinguished that the second event has been received in operation 1509, in response to the authentication which uses the secure preamble of operation 1507 having been carried out within a previously set time before the reception of the second event, the electronic device 101 or 401 may not perform the separate authentication of operation 1511. By virtue of this, the electronic device 101 or 401 may prevent time and power consumption utilized for the separate authentication.

According to one or more embodiments, an operation method of an electronic device (e.g., the electronic device 101 of FIG. 1, the electronic device 401 of FIG. 4, a smart key, a car, a door lock, or a notebook) includes acquiring a secure preamble, and controlling the communication module to transmit a distance measurement signal including the secure preamble to the external electronic device, and controlling the communication module to receive a response signal including a secure preamble of the external electronic device from the external electronic device, and authenticating the response signal of the external electronic device on the basis of the secure preamble of the external electronic device obtained from the received response signal, and in response to the authentication succeeding, determining a distance to the external electronic device on the basis of a transmission time of the distance measurement signal and a reception time of the response signal.

According to one or more embodiments, the method may further include, in response to the authentication succeeding, controlling the communication module to additionally transmit a final signal including the secure preamble to the external electronic device.

According to one or more embodiments, acquiring the secure preamble may include providing first credential information, and transmitting the first credential information to the external electronic device, and receiving second credential information of the external electronic device from the external electronic device, and providing the secure preamble on the basis of at least part of the first credential information and the second credential information.

According to one or more embodiments, providing the secure preamble on the basis of at least part of the first credential information and the second credential information may include providing a different secure preamble on the basis of at least part of the first credential information and the second credential information according to a predefined rule whenever transmitting a signal to the external electronic device.

According to one or more embodiments, transmitting the first credential information to the external electronic device may include encrypting the first credential information with a public key of the external electronic device and transmitting the encrypted credential information to the external electronic device, and receiving the second credential information of the external electronic device from the external electronic device may include receiving credential information encrypted with a public key of the electronic device from the external electronic device, and decoding the encrypted credential information with a private key of the electronic device and acquire the second credential information.

According to one or more embodiments, the method may further include controlling the communication module to measure a distance with the external electronic device by using signals including a general preamble, and distinguishing whether the measured distance meets a previously specified condition or whether a first event has been received, and in response to the measured distance meeting the previously specified condition or the first event having been received as the distinction result, may perform controlling the communication module to transmit a distance measurement signal including the secure preamble to the external electronic device, and controlling the communication module to receive a response signal including a secure preamble of the external electronic device from the external electronic device, and authenticating the response signal of the external electronic device on the basis of the secure preamble of the external electronic device obtained from the received response signal, and in response to the authentication succeeding, determining a distance to the external electronic device on the basis of a transmission time of the distance measurement signal and a reception time of the response signal.

According to one or more embodiments, the method may further include, while performing the authentication and distance measurement by using the signals including the secure preamble, distinguishing whether a second event has been received, and in response to the second event having been received as the distinction result, performing a separate authentication procedure with the external electronic device.

According to one or more embodiments, an operation method of an electronic device ((e.g., the electronic device 101 of FIG. 1 or the electronic device 401 of FIG. 4) may include acquiring a secure preamble, and receiving a distance measurement signal including a secure preamble of the external electronic device from the external electronic device, and authenticating the distance measurement signal on the basis of the secure preamble of the external electronic device included in the received distance measurement signal, and in response to the authentication succeeding, controlling the communication module to transmit a response signal including the secure preamble to the external electronic device.

According to one or more embodiments, the method may include receiving a final signal from the external electronic device, and authenticating the final signal on the basis of a secure preamble of the external electronic device included in the received final signal, and in response to the authentication succeeding, determining a distance to the external electronic device on the basis of a transmission time of the response signal and a reception time of the final signal.

According to one or more embodiments, acquiring the secure preamble may include provide credential information (below, first credential information), and transmit the first credential information to the external electronic device, and receive credential information (below, second credential information) of the external electronic device from the external electronic device, and provide the secure preamble on the basis of at least part of the first credential information and the second credential information.

According to one or more embodiments, an operation method of an electronic device ((e.g., the electronic device 101 of FIG. 1 or the electronic device 401 of FIG. 4) may include acquiring a secure preamble, and performing distance measurement with the external electronic device by using signals including general preambles, and distinguishing whether the measured distance meets a previously specified condition or whether a first event has been received, and in response to the measured distance meeting the previously specified condition or the first event having been received as the distinction result, performing authentication and distance measurement by using signals including the secure preamble.

Also, one or more embodiments of the present disclosure able to be embodied by the method or the device implementing the method may perform an authentication process concurrently with distance measurement and thus make possible distance measurement between authenticated devices without a separate authentication procedure and also, in course of a distance measurement process, perform an authentication procedure between devices and a user related operation of an authenticated position and thus, would be able to decrease an authentication procedure unnecessary for a user and achieving power consumption decrease and operation simplification. Also, in distance measurement using the conventional HRP-UWB communication, there can be a distance measurement result change caused by a relay attack, but one or more embodiments proposed in the present disclosure would be able to prevent this attack.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device of a vehicle, comprising:
a communication circuit performing communication with an external electronic device, according to a first communication scheme, and a second communication scheme different than the first communication scheme;
at least one processor operably connected with the communication circuit; and
at least one memory operably connected with the at least one processor,
wherein the at least one memory stores instructions executable by the at least one processor to cause the electronic device to:
exchange authentication information with the external electronic device, using the first communication scheme;
generate a first secure preamble;
execute ranging with the external electronic device via the communication circuit, using the second communication scheme, including:
transmitting, using the communication circuit, a distance measurement signal including the first secure preamble to the external electronic device,
receiving a response signal through the communication circuit including a second secure preamble generated by the external electronic device from the external electronic device,
determining a distance to the external electronic device based on a transmission time of the distance measurement signal and a reception time of the response signal; and
responsive to detecting that the external electronic device is disposed outside of the vehicle and the determined distance is within a predetermined range:
authenticating the response signal based on the second secure preamble and the first secure preamble,
based on successful authentication, re-executing ranging between the electronic device and the external electronic device, using the received response signal generated by the external electronic device, and
responsive to detecting occurrence of an event related to operation of the vehicle, executing a separate authentication with the external electronic device different from the authenticating of the received response signal.

2. The electronic device of claim 1, wherein the instructions are executable by the at least one processor to cause the electronic device to:
in response to successful authentication, control the communication circuit to transmit a final signal including the first secure preamble to the external electronic device; and
responsive to detecting that the external electronic device is disposed in an interior of the vehicle, re-executing again the ranging with the external electronic device, including re-executing the authentication, using the received response signal generated by the external electronic device.

3. The electronic device of claim 1, wherein exchanging the authentication information using the first communication scheme includes:
generating and transmitting first credential information to the external electronic device, and receiving second credential information of the external electronic device from the external electronic device, wherein the instructions are executable by the at least one processor to cause the electronic device to: generate the first secure preamble based on at least part of the first credential information and the second credential information; and
re-execute the ranging based on detecting a change in state of the external electronic device relative to the electronic device.

4. The electronic device of claim 3, wherein the communication circuit comprises a first communication circuit and a second communication circuit,
wherein the first credential information is transmitted through the first communication circuit, and
wherein the distance measurement signal and the response signal are transceived through the second communication circuit,
wherein the state of the external electronic device is selected from among states including an in-door state indicating presence within a vehicle in which the electronic device is disposed, a run-engine state indicating the vehicle is running, and a drive state indicating the vehicle is in motion.

5. The electronic device of claim 3, wherein the instructions are executable by the at least one processor to cause the electronic device to:
encrypt the first credential information with a first public key of the external electronic device, and transmit the encrypted credential information to the external electronic device;
receive second credential information encrypted with a second public key of the electronic device from the external electronic device; and
decode the second encrypted credential information with a private key of the electronic device to acquire the decoded second credential information.

6. The electronic device of claim 1, wherein the distance with the external electronic device is measured using signals including a general preamble;
wherein the instructions are executable by the at least one processor to cause the electronic device to:
detect whether the measured distance meets a previously specified condition, or whether a first event has been received,
wherein the distance measurement signal including the first secure preamble is transmitted in response to detecting that the measured distance meets the previously specified condition, or that the first event is received.

7. The electronic device of claim 1, wherein authenticating the response signal and determining the distance further includes: detecting whether a second event has been received,
wherein the instructions are executable by the at least one processor to cause the electronic device to:
in response to detecting that the second event is received, perform a separate authentication procedure with the external electronic device.

8. An electronic device of a vehicle, comprising:
a communication circuitry performing communication with an external electronic device, according to a first communication scheme, and a second communication scheme different than the first communication scheme;
at least one processor operably connected with the communication circuitry; and
at least one memory operably connected with the at least one processor,
wherein the at least one memory stores instructions executable by the at least one processor to cause the electronic device to:
exchange authentication information using the first communication scheme;
generate a first secure preamble;
in responsive to detecting that the external electronic device is disposed outside of the vehicle and is within a predetermined range, execute ranging using the second communication scheme, including:
receiving, using the communication circuitry, a distance measurement signal including a second secure preamble generated by the external electronic device from the external electronic device,
authenticating the distance measurement signal based on the second secure preamble of the external electronic device included in the received distance measurement signal, and
in response to successful authentication, transmitting a response signal including the first secure preamble to the external electronic device; and
executing ranging between the electronic device and the external electronic device, based on a reception time of the distance measurement signal and a transmission time of the response signal, and
in responsive to detecting occurrence of an event related to operation of the vehicle, executing a separate authentication with the external electronic device different from a first authenticating of a received response signal.

9. The electronic device of claim 8, wherein the at least one memory stores instructions executable by the at least one processor to cause the electronic device to:
receive a final signal from the external electronic device through the communication circuitry;
authenticate the final signal based on a third secure preamble of the external electronic device included in the received final signal; and
in response to successful authentication, determine a distance to the external electronic device based on a transmission time of the response signal and a reception time of the final signal
wherein responsive to detecting that the external electronic device is disposed in an interior of the vehicle, the external electronic device re-executes the ranging with the electronic device, including transmitting the received response signal to the external electronic device.

10. The electronic device of claim 8, wherein the at least one memory stores instructions executable by the at least one processor to cause the electronic device to:
receive first credential information of the external electronic device from the external electronic device,
wherein exchanging the authentication information using the first communication scheme includes: generating and transmitting second credential information to the external electronic device,
wherein the secure preamble is generated based on at least part of the first credential information and the second credential information, and wherein the ranging is re-executed based on detecting a change in state of the external electronic device relative to the electronic device.

11. The electronic device of claim 10, wherein the communication circuitry includes a first communication circuit and a second communication circuit,
wherein the first credential information is transmitted through the first communication circuit, and
wherein the distance measurement signal and the response signal are transceived through the second communication circuit,
wherein the state of the external electronic device is selected from among states including an in-door state indicating presence within a vehicle in which the electronic device is disposed, a run-engine state indicating the vehicle is running, and a drive state indicating the vehicle is in motion.

12. The electronic device of claim 10, wherein the at least one memory stores instructions executable by the at least one processor to cause the electronic device to:
receive the first credential information encrypted with a first public key of the electronic device; and
decode the encrypted first credential information with a private key of the electronic device to acquire the decoded first credential information,
wherein the second credential information is encrypted with a second public key of the external electronic device when transmitted to the external electronic device.

13. The electronic device of claim 8, wherein the at least one memory stores instructions executable by the at least one processor to cause the electronic device to:
receive a distance measurement signal including a general preamble from the external electronic device through the communication circuitry; and
in response to receiving the distance measurement signal, transmit a response signal including the general preamble through the communication circuitry.

14. The electronic device of claim 8, wherein the at least one memory stores instructions executable by the at least one processor to cause the electronic device to:
perform a separate authentication procedure with the external electronic device.

15. An operation method of an electronic device of a vehicle, the method comprising:
exchange authentication information with an external electronic device, using a communication circuit operating in a first communication scheme;
generating, by a processor, a first secure preamble;
executing ranging with the external electronic device via the communication circuit, using a second communication scheme different from the first communication scheme, including:
controlling by the processor the communication circuit to transmit a distance measurement signal including the first secure preamble to an external electronic device,
controlling the communication circuit to receive a response signal including a second secure preamble from the external electronic device, and
determining a distance to the external electronic device based on a transmission time of the distance measurement signal and a reception time of the response signal; and responsive to detecting that the external electronic device is disposed outside of the vehicle and the determined distance is within a predetermined range:
authenticating the response signal based on the second secure preamble and the first secure preamble,
based on successful authentication, re-executing ranging between the electronic device and the external electronic device, using the received response signal generated by the external electronic device, and
in responsive to detecting occurrence of an event related to operation of the vehicle, executing a separate authentication with the external electronic device different from the authenticating of the received response signal.

16. The method of claim 15, further comprising:
in response to successful authentication, control the communication circuit to transmit a final signal including the first secure preamble to the external electronic device; and
wherein responsive to detecting that the external electronic device is disposed in an interior of the vehicle, the external electronic device re-executes the ranging with the electronic device, including transmitting the received response signal to the external electronic device.

17. The method of claim 15, wherein exchanging the authentication information using the first communication scheme includes:
generating and transmitting first credential information to the external electronic device; and
receiving second credential information of the external electronic device from the external electronic device; and
wherein the method further comprises: generating the first secure preamble based on at least part of the first credential information and the second credential information; and
re-executing the ranging based on detecting a change in state of the external electronic device relative to the electronic device.

18. The method of claim 17, further comprising:
encrypting the first credential information with a first public key of the external electronic device and transmitting the encrypted credential information to the external electronic device;
receiving second credential information encrypted with a second public key of the electronic device from the external electronic device; and
decoding the second encrypted credential information with a private key of the electronic device to acquire the decoded second credential information.

19. The method of claim 15, wherein the distance with the external electronic device is measured using signals including a general preamble, the method further comprising:
detecting whether the measured distance meets a previously specified condition, or whether a first event has been received,
wherein the distance measurement signal including the first secure preamble is transmitted in response to detecting that the measured distance meets the previously specified condition, or that the first event is received.

20. The method of claim 15, wherein authenticating the response signal and determining the distance further includes: detecting whether a second event has been received, the method further comprising: in response to detecting that the second event is received, perform a separate authentication procedure with the external electronic device.

\* \* \* \* \*